US012329717B2

(12) United States Patent
Benz et al.

(10) Patent No.: US 12,329,717 B2
(45) Date of Patent: Jun. 17, 2025

(54) CONTROL SYSTEM FOR A PATIENT THERAPY DEVICE

(71) Applicant: Hill-Rom Services, Inc., Batesville, IN (US)

(72) Inventors: Eric D. Benz, Batesville, IN (US); John G. Byers, Batesville, IN (US); Scott M. Corbin, Sunman, IN (US); Kenneth L. Lilly, West Chester, OH (US); Joseph T. Canter, Harrison, OH (US); James L. Walke, Batesville, IN (US); Richard J. Schuman, Cary, NC (US); Richard H. Heimbrock, Cary, NC (US); Bradley T. Smith, Raleigh, NC (US); John V. Harmeyer, Cleves, OH (US); Lori Ann Zapfe, Milroy, IN (US); Mekashia Chenault, Batesville, IN (US); Kimberly Tuinstra, Bryon Center, MI (US); Michael A. Knecht, Batesville, IN (US); Robert M. Zerhusen, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 733 days.

(21) Appl. No.: 16/829,576

(22) Filed: Mar. 25, 2020

(65) Prior Publication Data

US 2020/0306130 A1 Oct. 1, 2020

Related U.S. Application Data

(60) Provisional application No. 62/826,744, filed on Mar. 29, 2019.

(51) Int. Cl.
*A61H 9/00* (2006.01)
*A61G 7/05* (2006.01)

(52) U.S. Cl.
CPC ......... *A61H 9/0092* (2013.01); *A61G 7/0506* (2013.01); *A61H 2201/1642* (2013.01);
(Continued)

(58) Field of Classification Search
CPC .......... A61H 9/0092; A61H 2201/1642; A61H 2201/5007; A61H 2201/5071;
(Continued)

(56) References Cited

U.S. PATENT DOCUMENTS 6,876,303 B2 * 4/2005 Reeder .................. A61B 5/1113 340/286.07
6,877,572 B2 * 4/2005 Vogel .................. A61G 7/0513 180/19.1

(Continued)

FOREIGN PATENT DOCUMENTS

EP 1623666 A2 * 2/2006 ............. A61B 5/002
EP 2702972 A2 * 3/2014 ............. A47C 27/10

(Continued)

*Primary Examiner* — Timothy A Stanis
*Assistant Examiner* — Tyler A Raubenstraw
(74) *Attorney, Agent, or Firm* — Barnes & Thornburg LLP

(57) ABSTRACT

A therapy system includes a patient support apparatus and a pneumatic therapy device that is coupleable to the patient support apparatus. The therapy device may receive power and air flow from the patient support apparatus.

20 Claims, 13 Drawing Sheets

(52) U.S. Cl.
CPC ................ *A61H 2201/5007* (2013.01); *A61H 2201/5043* (2013.01); *A61H 2201/5048* (2013.01); *A61H 2201/5071* (2013.01); *A61H 2201/5097* (2013.01); *A61H 2203/0437* (2013.01); *A61H 2203/0456* (2013.01)

(58) Field of Classification Search
CPC .... A61H 2203/0437; A61H 2203/0456; A61H 9/0078; A61H 2201/5043; A61H 2201/5048; A61H 2201/5097; A61H 9/005; A61H 9/00; A61G 7/0506; A61G 7/05
See application file for complete search history.

(56) References Cited

U.S. PATENT DOCUMENTS

| | | | | | |
|---|---|---|---|---|---|
| 6,987,448 | B2 * | 1/2006 | Catton | F17D 1/04 | 137/557 |
| 7,591,796 | B1 * | 9/2009 | Barak | A61H 9/0078 | 601/152 |
| 7,641,623 | B2 * | 1/2010 | Biondo | A61H 9/0078 | 601/149 |
| 8,679,040 | B2 * | 3/2014 | Horst | A61H 3/00 | 601/5 |
| 8,752,220 | B2 * | 6/2014 | Soderberg | A61G 7/0524 | 5/426 |
| 8,845,562 | B2 * | 9/2014 | Receveur | A61H 9/0078 | 601/84 |
| 9,017,273 | B2 * | 4/2015 | Burbank | A61H 23/0218 | 601/46 |
| 9,237,979 | B2 * | 1/2016 | Carnell | A61G 12/005 | |
| 9,492,341 | B2 * | 11/2016 | Huster | A61G 7/0507 | |
| 9,539,155 | B2 * | 1/2017 | Johannigman | A61G 7/012 | |
| 9,737,454 | B2 * | 8/2017 | Hornbach | A61B 5/0295 | |
| 9,827,157 | B2 * | 11/2017 | Newkirk | A61G 7/0506 | |
| 9,833,369 | B2 * | 12/2017 | Meyer | A61G 7/05776 | |
| 10,166,166 | B1 * | 1/2019 | Theriot | A61H 9/0078 | |
| 10,507,158 | B2 * | 12/2019 | Brzenchek | A47C 21/042 | |
| 10,517,784 | B2 * | 12/2019 | Zerhusen | A61G 7/05776 | |
| 10,561,549 | B2 * | 2/2020 | Walton | A61B 5/746 | |
| 11,071,666 | B2 * | 7/2021 | Emmons | G16H 20/00 | |
| 2002/0042583 | A1 * | 4/2002 | Barak | A61F 5/012 | 601/1 |
| 2003/0233118 | A1 * | 12/2003 | Hui | A61H 9/0078 | 606/201 |
| 2004/0106884 | A1 * | 6/2004 | Bolam | A61H 9/0078 | 601/152 |
| 2004/0177445 | A1 * | 9/2004 | Osborne | A61G 7/005 | 5/430 |
| 2005/0159690 | A1 * | 7/2005 | Barak | A61H 9/0078 | 601/149 |
| 2006/0004245 | A1 * | 1/2006 | Pickett | A61H 9/0078 | 600/16 |
| 2008/0289108 | A1 * | 11/2008 | Menkedick | A61G 7/052 | 5/610 |
| 2009/0177184 | A1 * | 7/2009 | Christensen | A61H 9/0057 | 604/113 |
| 2011/0295163 | A1 * | 12/2011 | Vijayanagar | A61F 7/02 | 601/44 |
| 2012/0277789 | A1 * | 11/2012 | Caldarone | A61H 9/0078 | 606/202 |
| 2013/0046216 | A1 * | 2/2013 | O'Keefe | A61B 5/6892 | 601/149 |
| 2013/0074268 | A1 * | 3/2013 | Receveur | A61G 7/05792 | 137/565.17 |
| 2013/0331752 | A1 * | 12/2013 | Vess | A61H 9/0092 | 602/13 |
| 2013/0340169 | A1 * | 12/2013 | Zerhusen | A61G 7/053 | 177/144 |
| 2014/0236058 | A1 * | 8/2014 | Lee | A61B 17/1355 | 601/84 |
| 2014/0277252 | A1 * | 9/2014 | Hyde | A61F 5/56 | 607/42 |
| 2015/0057585 | A1 * | 2/2015 | Ladd | A61H 9/0078 | 601/149 |
| 2015/0094629 | A1 * | 4/2015 | Crowley | G05D 7/0676 | 601/149 |
| 2015/0135436 | A1 * | 5/2015 | Stryker | A61G 7/018 | 5/600 |
| 2016/0136356 | A1 * | 5/2016 | Ribble | A61B 5/14552 | 705/2 |
| 2017/0000685 | A1 * | 1/2017 | Rohr | A47C 21/006 | |
| 2017/0100301 | A1 * | 4/2017 | Denson | A61F 5/0585 | |
| 2017/0172838 | A1 * | 6/2017 | Brosnan | A61H 9/0078 | |
| 2017/0273851 | A1 * | 9/2017 | Larmer | A61F 13/067 | |
| 2018/0272147 | A1 * | 9/2018 | Freeman | G16H 50/30 | |
| 2018/0369039 | A1 * | 12/2018 | Bhimavarapu | G16H 40/63 | |
| 2019/0000329 | A1 * | 1/2019 | Denson | A61H 9/0092 | |
| 2019/0015289 | A1 * | 1/2019 | Grimoldby | A61F 5/012 | |
| 2019/0021924 | A1 * | 1/2019 | Trepanier | A61B 5/746 | |
| 2019/0167509 | A1 * | 6/2019 | Wright | A61H 9/0092 | |
| 2020/0085673 | A1 * | 3/2020 | Seo | A61H 9/0078 | |

FOREIGN PATENT DOCUMENTS

| | | | | | |
|---|---|---|---|---|---|
| EP | 2712598 | B1 * | 7/2020 | A61H 23/04 |
| WO | WO-2004091463 | A2 * | 10/2004 | A61H 9/0078 |
| WO | WO-2016028794 | A1 * | 2/2016 | A61G 7/002 |
| WO | WO-2020041854 | A1 * | 3/2020 | A61H 1/00 |

* cited by examiner

CONTROL SYSTEM FOR A PATIENT THERAPY DEVICE

CROSS REFERENCE TO RELATED APPLICATIONS

This application claims priority under 35 U.S.C. § 119(e) to U.S. Provisional Application No. 62/826,744, filed Mar. 29, 2019, which is expressly incorporated by reference herein.

BACKGROUND

The present disclosure relates to patient support apparatuses such as patient beds and particularly, to patient support apparatuses that have therapy devices. More particularly, the present disclosure relates to patient support apparatuses that have integrated limb compression devices.

Patient support apparatuses, such as patient beds, are used in patient rooms to support sick patients and to support patients recovering from surgery, for example. It is desirable for some patients to wear limb compression sleeves, such as foot sleeves, calf sleeves, thigh sleeves, or a combination of these sleeves. The sleeves are inflated and deflated intermittently to promote blood flow within the patient's limb or limbs thereby helping to prevent deep vein thrombosis, for example. Usually, a separate control box which houses the pneumatic components that operate to inflate and deflate the compression sleeve(s) worn by the patient is provided.

Oftentimes, the control box for the compression sleeve(s) is hung on the footboard of the patient bed. Thus, there is a risk that the control box can slip off of the footboard. Also, relatively long power cords are required to be routed from the control box at the foot end of the bed to a power outlet near the head end of the bed or elsewhere in the patient room. The foot ends of patient beds are typically oriented more toward the center of a room and not adjacent to any room wall. The power cord, therefore, may pose a tripping hazard for caregivers, patients, and visitors. The power cord also may be in the way of other carts or wheeled stands, such as those used to support IV pumps and bags, for example. When not in use, the control box must be stored separately within a healthcare facility.

There is an ongoing need to reduce the labor required for caregivers to deliver quality patient care. Further, there is an ongoing need for the cost of healthcare to be reduced. Finally, the comfort of a person in a clinical environment is directly related to their perception of the quality of their care and their recovery. A therapy system that provides patient comfort, reduced cost, and improved caregiver efficiency addresses the aforementioned needs.

SUMMARY

The present application discloses one or more of the features recited in the appended claims and/or the following features which, alone or in any combination, may comprise patentable subject matter:

According to a first aspect of the present disclosure, a therapy system comprises a pneumatic therapy device and a patient support apparatus. The patient support apparatus includes a removable component. The removable component includes a mounting pin operable to engage a mounting hole on a frame of the patient support apparatus such that the engagement of the mounting pin to the mounting hole provides an electrical connection such that direct current is transferred from the frame to the component. The removable component includes an air system operable to provide a flow of air to the pneumatic therapy device and a port operable to be engaged by a conduit of the pneumatic therapy device to provide a flow path from the air system to a compression sleeve of the pneumatic therapy device.

In some embodiments of the first aspect, the air system is contained within the removable component. In some embodiments, the air system is coupled to a port on the removable component and receives power through a coupling to the port. In some embodiments of the first aspect, the power is isolated DC power. In some embodiments of the first aspect, the power is provided by a battery on the patient support apparatus.

In some embodiments of the first aspect, the therapy system further comprises a user interface supported on the frame, and a controller including a processor and a memory device, the memory device including instructions that are executable by the processor to control the source of pressurized air, distribution system, and user interface. The instructions make the controller operable to detect that the second end of the conduit of the pneumatic therapy assembly has been connected to the outlet of the distribution assembly and provide an interface screen on the user interface to allow a user to control of the source of pressurized air to operate the pneumatic therapy device to provide therapy to an occupant of the patient support apparatus.

In some embodiments of the first aspect, the memory device includes further instructions that, when executed by the processor, cause the controller to fill a compression sleeve of the pneumatic therapy device with air, monitor the pressure in the sleeve, determine whether the pressure in the sleeve has changed, and, if the pressure has changed, compute a therapeutic pressure for the particular patient, and apply the therapeutic pressure to the patient during the pneumatic therapy.

In some embodiments of the first aspect, the memory device includes further instructions that, when executed by the processor, cause the controller to monitor for the presence of a pneumatic therapy device, and, if a pneumatic therapy device is detected, initiate a timer to monitor for the initiation of a pneumatic therapy by a caregiver, and if the caregiver does not initiate a pneumatic therapy in a predetermined time, initiate the pneumatic therapy automatically.

In some embodiments of the first aspect, the memory device includes further instructions that, when executed by the processor, cause the controller to monitor a sensor to determine if the pneumatic therapy device has been removed by a patient, and, if the pneumatic therapy device has been removed by the patient, issue an alarm.

In some embodiments of the first aspect, the memory device includes further instructions that, when executed by the processor, cause the controller to issue an audible verbal prompt regarding the patient therapy device.

In some embodiments of the first aspect, the therapy system further comprises a user interface supported on the frame, and a controller including a processor and a memory device, the memory device including instructions that are executable by the processor to control the source of pressurized air, distribution system, and user interface, the instructions operable to detect that the second end of the conduit of the pneumatic therapy assembly has been connected to the outlet of the distribution assembly and provide an interface screen on the user interface to allow a user to control of the source of pressurized air to operate the pneumatic therapy device to provide therapy to an occupant of the patient support apparatus.

In some embodiments of the first aspect, the memory device includes further instructions that, when executed by the processor, cause the controller to fill a compression sleeve of the pneumatic therapy device with air, monitor the pressure in the sleeve, determine whether the pressure in the sleeve has changed, and, if the pressure has changed, compute a therapeutic pressure for the particular patient, and apply the therapeutic pressure to the patient during the pneumatic therapy.

In some embodiments of the first aspect, the memory device includes further instructions that, when executed by the processor, cause the controller to monitor for the presence of a pneumatic therapy device, and, if a pneumatic therapy device is detected, initiate a timer to monitor for the initiation of a pneumatic therapy by a caregiver, and if the caregiver does not initiate a pneumatic therapy in a predetermined time, initiate the pneumatic therapy automatically.

In some embodiments of the first aspect, the memory device includes further instructions that, when executed by the processor, cause the controller to monitor a sensor to determine if the pneumatic therapy device has been removed by a patient, and, if the pneumatic therapy device has been removed by the patient, issue an alarm.

In some embodiments of the first aspect, the memory device includes further instructions that, when executed by the processor, cause the controller to issue an audible verbal prompt regarding the patient therapy device.

In some embodiments of the first aspect, the pneumatic therapy device comprises a compression sleeve that is adjustable to vary the size of the compression sleeve when applying the compression sleeve to a particular patient.

According to a second aspect of the present disclosure, a therapy system comprises a pneumatic therapy device, and a patient support apparatus. The pneumatic therapy device includes a compression sleeve and a conduit having a first end coupled to the compressions sleeve and a second end. The patient support apparatus includes a frame, a source of pressurized air supported by the frame, a distribution assembly, a user interface, and a controller. The distribution assembly includes a conduit for directing a flow of pressurized air from the source of pressurized air, an outlet, and a sensor for detecting a pressure. The user interface is supported on the frame. The controller includes a processor and a memory device, the memory device including instructions that are executable by the processor to control the source of pressurized air, distribution system, and user interface. The instructions cause the controller to be operable to detect that the second end of the conduit of the pneumatic therapy assembly has been connected to the outlet of the distribution assembly, and if the conduit has been connected, cause the controller to fill a compression sleeve of the pneumatic therapy device with air, monitor the pressure in the sleeve, determine whether the pressure in the sleeve has changed, and, if the pressure has changed, compute a therapeutic pressure for the particular patient, and apply the therapeutic pressure to the patient during the pneumatic therapy.

In some embodiments of the second aspect, the memory device may include further instructions that, when executed by the processor, cause the controller to monitor for the presence of a pneumatic therapy device, and, if a pneumatic therapy device is detected, initiate a timer to monitor for the initiation of a pneumatic therapy by a caregiver, and if the caregiver does not initiate a pneumatic therapy in a predetermined time, initiate the pneumatic therapy automatically.

In some embodiments of the second aspect, the memory device may include further instructions that, when executed by the processor, cause the controller to monitor a sensor to determine if the pneumatic therapy device has been removed by a patient, and, if the pneumatic therapy device has been removed by the patient, issue an alarm.

In some embodiments of the second aspect, the memory device may include further instructions that, when executed by the processor, cause the controller to issue an audible verbal prompt regarding the patient therapy device.

In some embodiments of the second aspect, the pneumatic therapy device may comprise a compression sleeve that is adjustable to vary the size of the compression sleeve when applying the compression sleeve to a particular patient.

According to a third aspect of the present disclosure, a therapy system comprises a pneumatic therapy device, and a patient support apparatus. The pneumatic therapy device includes a compression sleeve and a conduit having a first end coupled to the compressions sleeve and a second end. The patient support apparatus includes a frame, a source of pressurized air supported by the frame, a distribution assembly, a user interface, and a controller. The distribution assembly includes a conduit for directing a flow of pressurized air from the source of pressurized air, an outlet, and a sensor for detecting a pressure. The user interface is supported on the frame. The controller includes a processor and a memory device, the memory device including instructions that are executable by the processor to control the source of pressurized air, distribution system, and user interface. The instructions causing the controller to be operable to detect that the second end of the conduit of the pneumatic therapy assembly has been connected to the outlet of the distribution assembly, and, if the conduit has been connected, initiate a timer to monitor for the initiation of a pneumatic therapy by a caregiver, and if the caregiver does not initiate a pneumatic therapy in a predetermined time, initiate the pneumatic therapy automatically.

In some embodiments of the third aspect, the memory device includes further instructions that, when executed by the processor, cause the controller to monitor a sensor to determine if the pneumatic therapy device has been removed by a patient, and, if the pneumatic therapy device has been removed by the patient, issue an alarm.

In some embodiments of the third aspect, the memory device includes further instructions that, when executed by the processor, cause the controller to issue an audible verbal prompt regarding the patient therapy device.

In some embodiments of the third aspect, the pneumatic therapy device comprises a compression sleeve that is adjustable to vary the size of the compression sleeve when applying the compression sleeve to a particular patient.

According to a fourth aspect of the present disclosure, a therapy system comprises a patient support apparatus and a pneumatic therapy device. The patient support apparatus includes a frame, a patient support surface supported on the frame, and a user interface, and an air system supported on the frame. The airs system includes a source of pressurized air, an outlet coupled to the source of pressurized air, and an air system controller in communication with the user interface, the source of pressurized air, and the outlet. The air system controller includes a processor, and a memory device. The air system also includes a port removeably pneumatically coupling the pneumatic therapy device and the outlet. The memory device includes instructions, that, when executed by the processor, causes the air system controller to detect a connection of the pneumatic therapy device to the outlet and communicates a signal to the user interface to allow a user to control operation of the pneumatic therapy device from the user interface, and, if the user does not initiate operation of the pneumatic therapy device, initiate operation of the pneumatic therapy device automatically.

In some embodiments of the fourth aspect, the pneumatic therapy device may draw power from a power supply of the patient support apparatus to operate the pneumatic therapy device and the air system, the air system simultaneously provides pressurized air to both the patient support apparatus In some embodiments of the fourth aspect, the power supply is formed as a direct current power supply.

In some embodiments of the fourth aspect, the patient support apparatus may be further formed to include a footboard coupled to the frame and the footboard is formed as the power supply. In some embodiments of the fourth aspect, the footboard may be formed to include a pair of mounting pins extending therefrom and configured to communicate with the frame of the patient support apparatus to convey power to the footboard. In some embodiments of the fourth aspect, the footboard may be further formed to removeably couple to the pneumatic therapy device and provide power to the pneumatic therapy device.

In some embodiments of the fourth aspect, the power supply is formed as a battery to store DC power from the patient support apparatus for communication to and use by the pneumatic therapy device.

In some embodiments of the fourth aspect, the battery of the patient support apparatus provides power to the pneumatic therapy device when a loss of power to the patient support apparatus occurs.

In some embodiments of the fourth aspect, the pneumatic therapy device is a sequential compression device (SCD) assembly.

In some embodiments of the fourth aspect, the pneumatic therapy device may further comprise at least one therapy sleeve operable to engage an occupant, and at least one hose having a first end, and a second end spaced apart from the first end. In some embodiments of the fourth aspect, the at least one hose is removeably coupled to the therapy sleeve at the first end of the at least one hose and to the port at the second end of the at least one hose, the at least one hose further directing a pressurized airstream from the air system to the therapy sleeve.

In some embodiments of the fourth aspect, the pneumatic therapy device may be in communication with a plurality of sensors coupled thereto.

In some embodiments of the fourth aspect, the memory device may include instructions, that, when executed by the processor, causes the air system controller to communicate with the plurality of sensors to determine the initiation of therapy and pressure changes within the sleeve and compare the pressure changes to a pre-programmed pressure threshold programmed within the memory device.

In some embodiments of the fourth aspect, the sleeve may be formed to move between a plurality of lengths and includes a body section; an at least one foldable section coupled to the body section; and an least one retainment mechanism having a portion of the retainment mechanism coupled to the foldable section, and a second portion of the retainment mechanism coupled to the body section and formed to removeably couple to the portion of the retainment mechanism couple to the foldable section.

In some embodiments of the fourth aspect, the sleeve further may include a knee strap having a first end coupled to the body section and a second end formed to include an additional retainment mechanism to removeably couple the second end of the knee strap to the body section.

In some embodiments of the fourth aspect, the air system controller may detect a removal of the pneumatic therapy device from the distribution manifold.

In some embodiments of the fourth aspect, the pneumatic therapy device may be in communication with a plurality of sensors coupled thereto and the memory device includes instructions, that, when executed by the processor, causes the air system controller to communicate with the plurality of sensors to determine the length of time the pneumatic therapy device has been coupled to the distribution manifold.

In some embodiments of the fourth aspect, the air system controller may be formed to further initiate a pre-programmed timer, determine if the timer has elapsed, determine if the pneumatic therapy has been initiated, and automatically initiate therapy if not done so already.

In some embodiments of the fourth aspect, the patient support apparatus may further include a radio to communicate with the source of pressurized air and determine the functionality thereof.

In some embodiments of the fourth aspect, n the pneumatic therapy device may further include a plurality of sensors coupled to the at least one sleeve and automatically detect the removal of the at least one sleeve from the occupant.

In some embodiments of the fourth aspect, the removal of the at least one sleeve from the occupant may be audibly communicated to the patient through the user interface and further communicated to a nurse call station.

Additional features, which alone or in combination with any other feature(s), including those listed above and those listed in the claims, may comprise patentable subject matter and will become apparent to those skilled in the art upon consideration of the following detailed description of illustrative embodiments exemplifying the best mode of carrying out the invention as presently perceived.

BRIEF DESCRIPTION OF THE DRAWINGS

The detailed description particularly refers to the accompanying figures in which.

DETAILED DESCRIPTION

Figure 1:
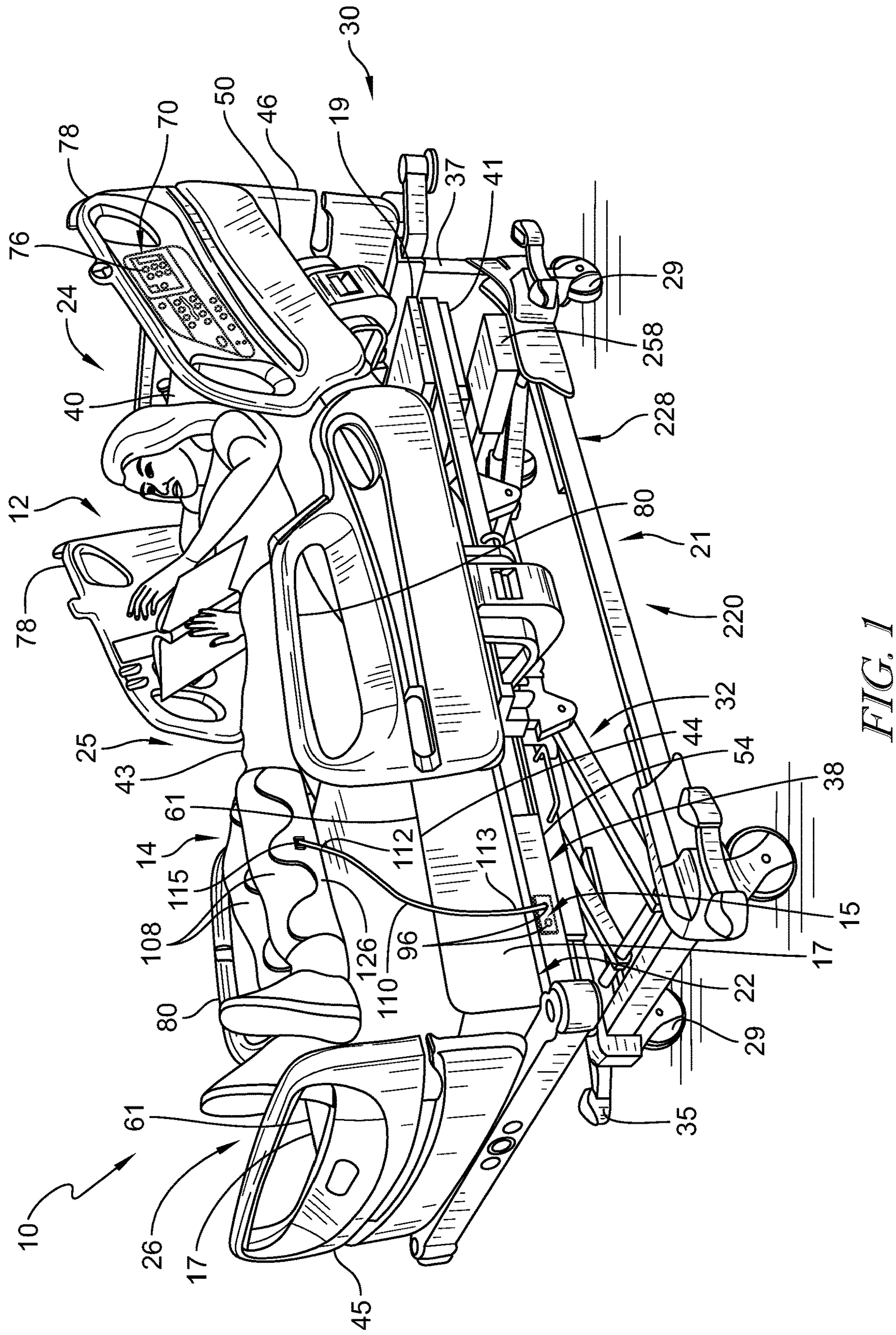
FIG. 1 is a perspective view of a patient support apparatus illustratively embodied as a hospital bed with a therapy system and showing a patient lying on the bed with compression sleeves positioned on the patient's lower limbs and further showing a foot section of a frame of the hospital bed having ports for coupling a conduit thereto, the conduit extending between the port and the compression sleeve to guide pressurized fluid between the patient support and the compression sleeves.
Figure 2:
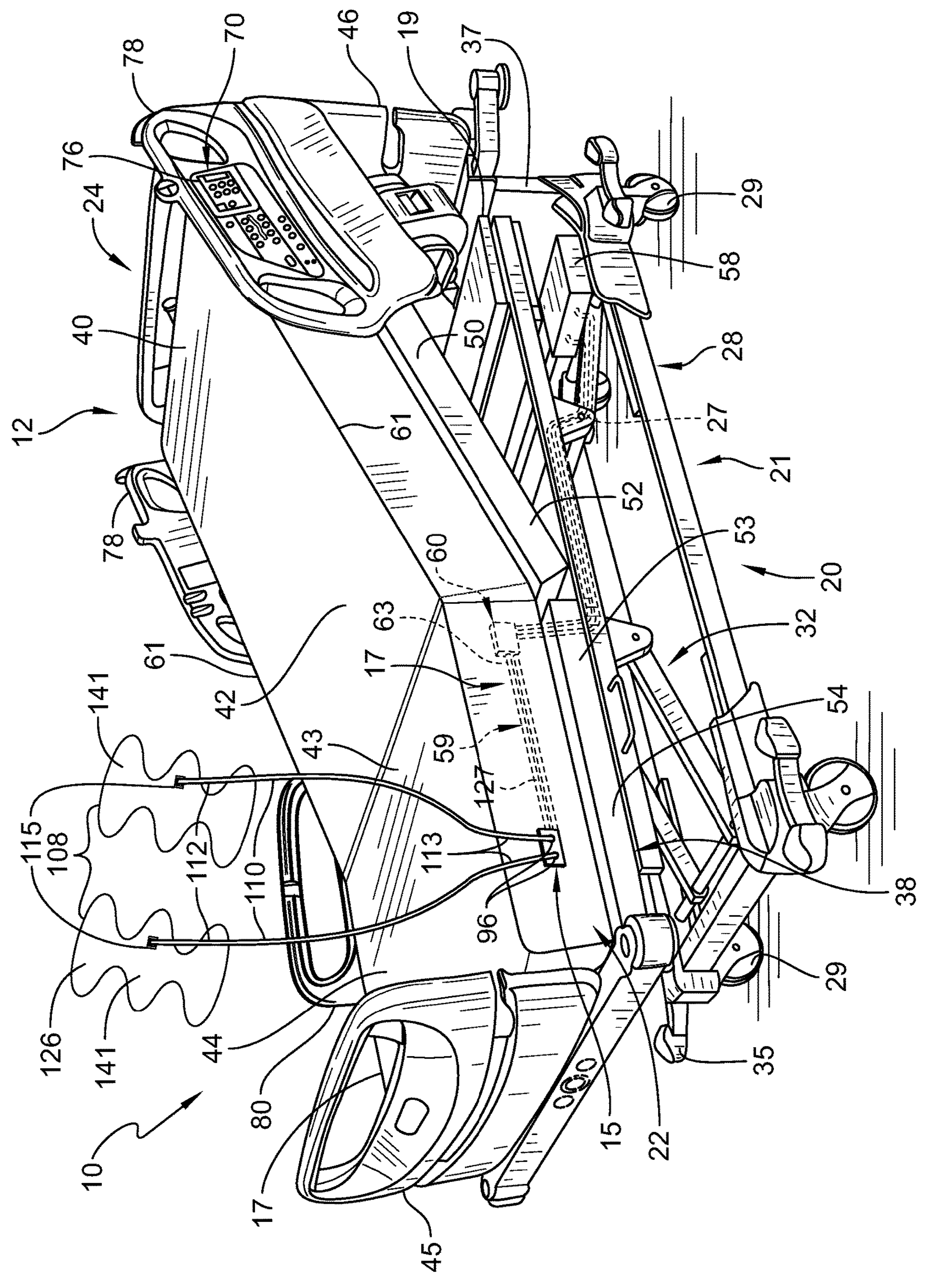
FIG. 2 is a perspective view of the patient support apparatus of FIG. 1 showing a portion of the air system of the bed coupled to the frame of the patient support apparatus and in communication with the conduit and compression sleeve(s) (together forming a pneumatic therapy device) coupled thereto.

In one embodiment of a therapy system 10, the system 10 includes a patient support apparatus 12 and a pneumatic therapy device 14 configured to couple to the patient support apparatus 12. The patient support apparatus 12, illustratively embodied as a hospital bed 12, includes a patient support structure 21 such as a frame 21 that supports a surface or mattress 22 as shown in FIGS. 1 and 2. While the patient support apparatus 12 is embodied as a hospital bed 12, this disclosure is applicable to other types of patient support apparatuses, including other types of beds, surgical tables, examination tables, stretchers, and the like. As will be described below in further detail, a main controller 18 (shown in FIG. 3) of patient support apparatus 12 is operable to control operation of pneumatic therapy device 14 using an air system 20 of patient support apparatus 12.

Pneumatic therapy device 14 is illustratively embodied as a sequential compression device assembly (SCD assembly) 14, as shown in FIGS. 1 and 2, although a variety of other pneumatic therapy devices known in the art may be used in addition to/in place of SCD assembly 14. As such, pneumatic therapy device and SCD assembly 14 are used interchangeably throughout the application. Pneumatic therapy device 14 disclosed herein utilizes an air source 58 of air system 20 coupled to patient support apparatus 12, shown diagrammatically in FIGS. 3 and 4, and is formed to include one or more compression sleeves 108 that are placed upon a patient's limbs as shown, for example, in FIG. 1. Air source, air supply, and source for pressurized air are used interchangeably throughout the application. In some embodiments, sleeves 108 are embodied as wraps that are sized to wrap about a patient's calves, thighs, and/or feet. Combination sleeves (not shown) that attach to a patient's calves and feet or that attach to a patient's calves and thighs or that attach to a patient's feet, calves and thighs are within the scope of this disclosure. Upper limb sleeves (not shown) removeably coupleable to a patient's arms and/or torso are also within the scope of this disclosure. However, sleeves 108 that attach to the patient's lower limbs are the ones that are most commonly used in sequential compression device assembly 14, particularly, for the prevention of deep vein thrombosis (DVT).

The SCD assemblies 14 disclosed herein are sometimes referred to as limb compression devices, intermittent compression devices (ICDs), DVT prevention systems, or the like. Thus, these terms and variants thereof are used interchangeably herein to cover all types of devices and systems that have compression sleeves with one or more inflatable and deflatable chambers that are controlled pneumatically by delivery and removal of air or other gas from a set of pneumatic components that are contained within patient support apparatus 12.

Referring to FIGS. 1 and 2, frame 21 of patient support apparatus 12 includes a lower frame or base 28, an upper frame assembly 30, and a lift system 32 coupling upper frame assembly 30 to base 28. Lift system 32 is operable to raise, lower, and tilt upper frame assembly 30 relative to base 28. Patient support apparatus 12 has a head end 24 and a foot end 26 spaced apart from each other with a body section 25 extending therebetween. Patient support apparatus 12 further includes a footboard 45 coupled to patient support apparatus 12 at foot end 26, a headboard 46 coupled to patient support apparatus 12 at head end 24, and a pair of sides 17 spaced apart from each other and extending laterally from foot end 26 to head end 24 of patient support apparatus 12. Headboard 46 is coupled to an upstanding portion 37 of base 28. Footboard 45 is removeably coupled to an extendable and retractable portion 47 of a foot section 54 of a patient support deck 38 of upper frame assembly 30. In other embodiments, footboard 45 is coupled to a foot end

39 of upper frame assembly 30. Illustratively, base 28 includes a plurality of wheels or casters 29 that roll along a floor as patient support apparatus 12 is moved from one location to another. A set of foot pedals 35 are coupled to base 28 and are used to brake and release casters 29 as is known in the art.

Illustrative patient support apparatus 12 has four siderail assemblies coupled to upper frame assembly 30 as shown in FIG. 1. The four siderail assemblies include a pair of head siderail assemblies 78 (sometimes referred to as head rails) and a pair of foot siderail assemblies 80 (sometimes referred to as foot rails). Each of the siderail assemblies 78, 80 is movable between a raised position, as shown in FIG. 1, and a lowered position (not shown but well-known to those skilled in the art). Siderail assemblies 78, 80 are sometimes referred to herein as siderails 78, 80.

Upper frame assembly 30 includes a patient support deck 38 that supports mattress 22. Patient support deck 38 is situated over an upper frame 19 of upper frame assembly 30. Mattress 22 includes a head section 40, a seat section 42, a thigh section 43, and a foot section 44 in the illustrative example as shown in FIGS. 1 and 2. Patient support deck 38 is formed to include a head section 50, a seat section 52, a thigh section 53, and a foot section 54 such that respective mattress sections 40, 42, 43, 44 are positioned thereon. Mattress sections 40, 42, 43, 44 are each movable relative to upper frame 19. For example, head section 40 pivotably raises and lowers relative to seat section 42 whereas foot section 54 pivotably raises and lowers relative to thigh section 43. Additionally, thigh section 53 articulates relative to seat section 42.

Mattress 22 further includes a pair of edges 61 wherein each of the pair of edges 61 is spaced apart from each other with respective section 40, 42, 43, 44 extending therebetween. In the illustrative embodiment, thigh section 43 and/or foot section 44 is configured to support SCD assembly 14 when independent of the patient as well as when coupled thereto. As will be discussed below, in some embodiments, thigh section 43 and/or foot section 44 may be formed to integrally include SCD assembly 14 and/or be configured to store SCD assembly 14 therein when not in use, when patient is ambulatory, and/or to avoid SCD assembly 14 from contacting a floor of a hospital/care center.

Figure 3:
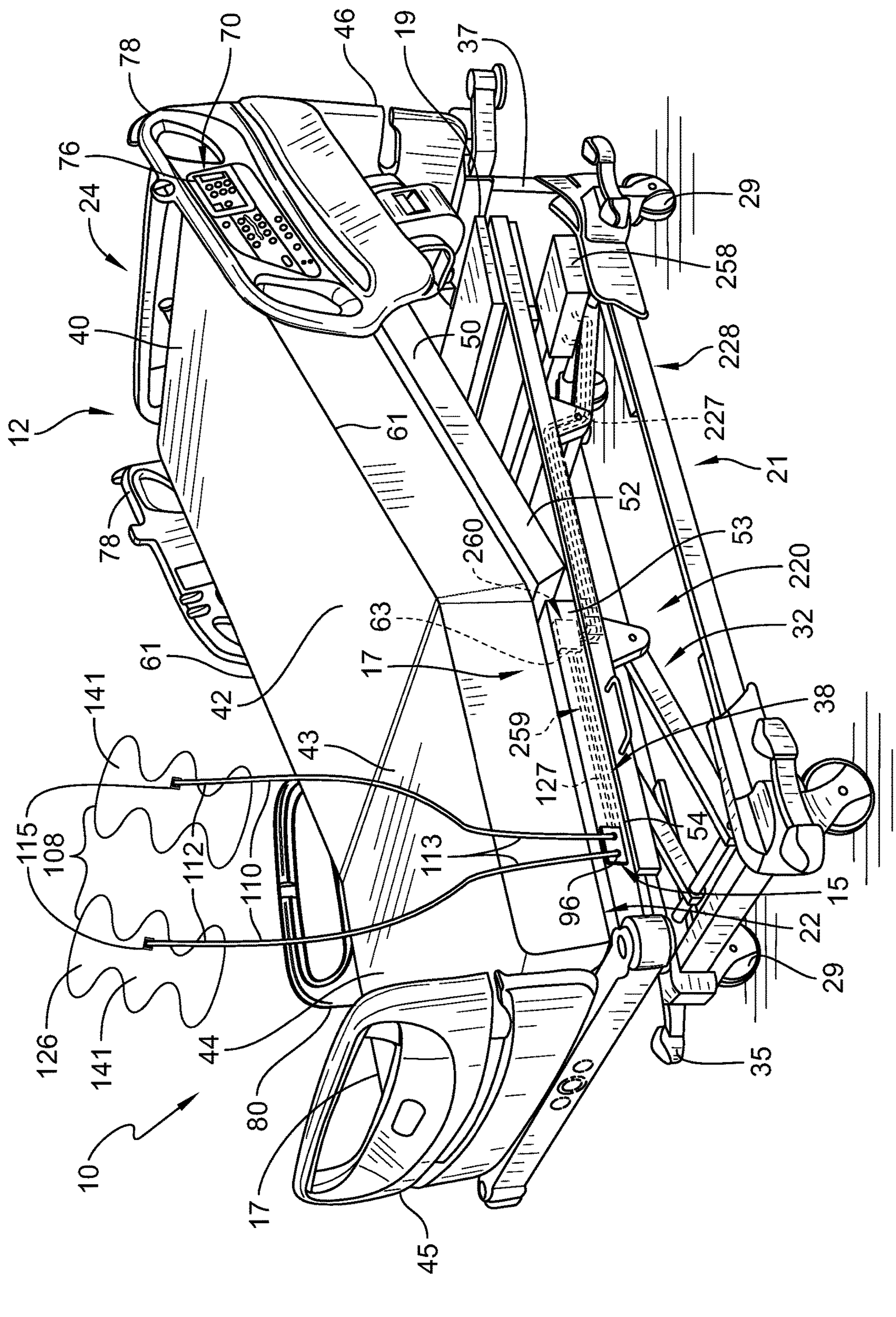
FIG. 3 is a perspective view of another embodiment similar to FIG. 1, the embodiment of FIG. 3 having compression sleeves coupled to the bed and further showing a foot section of the frame of the hospital bed having ports for coupling a conduit thereto, the conduit extending between the port and the compression sleeve to guide pressurized fluid between the patient support apparatus and the compression sleeves.
Figure 4:
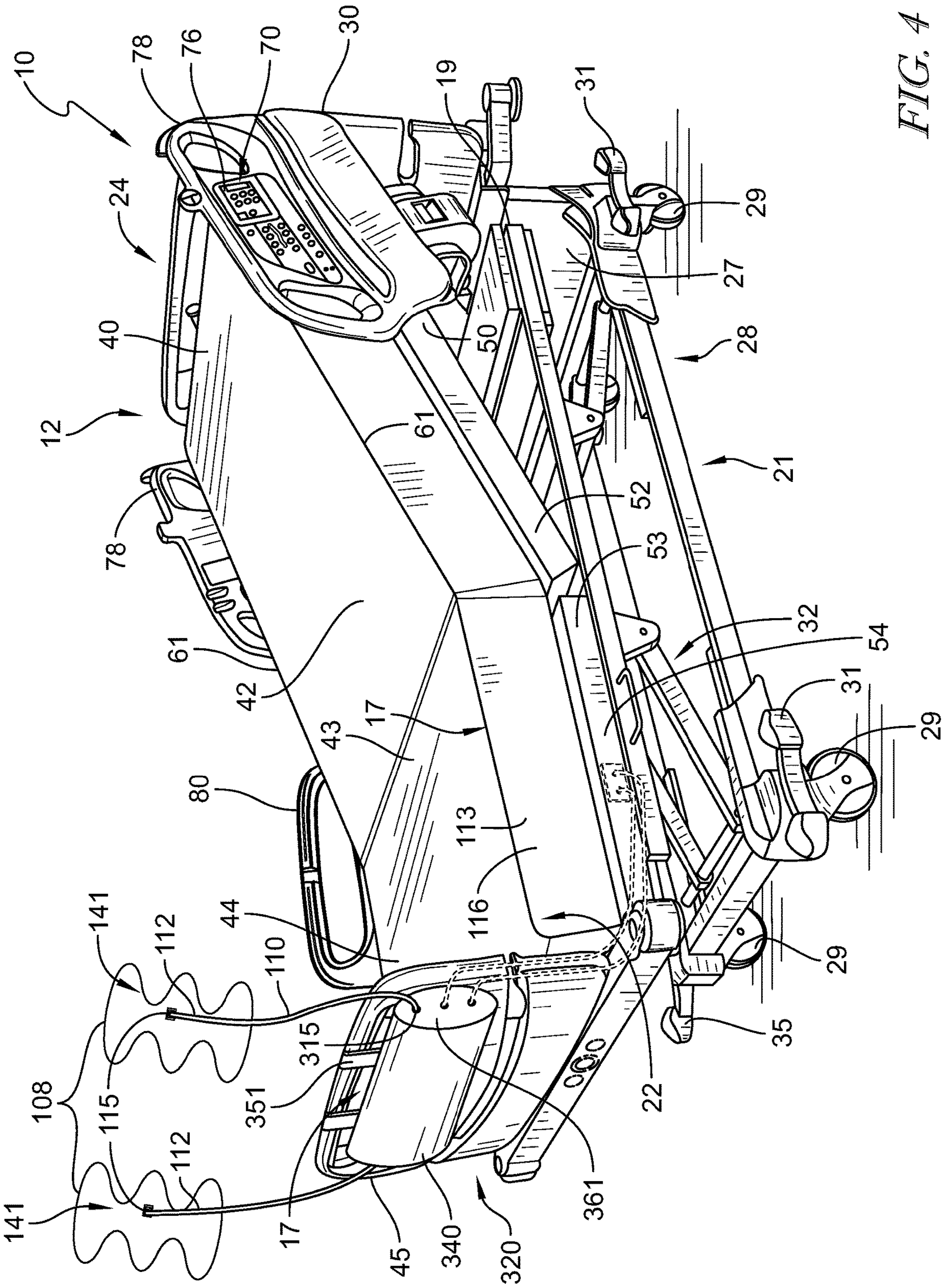
FIG. 4 is a perspective view of another embodiment similar to FIG. 1, the embodiment of FIG. 4 including an air source located in a housing removeably coupled to a footboard of the bed, the air source is configured to couple to the conduits and may further be configured to couple to the bed for power.

Referring to FIGS. 3 and 4, when in use, SCD assembly 14 is configured to communicate with main controller 18 electrically coupled to air system 20 and a user interface 70. Main controller 18 may be formed to include various circuit boards, electronics modules, and the like that are electrically and communicatively interconnected. Main controller 18 includes one or more microprocessors or microcontrollers 72 that execute software to perform the various bed control functions and algorithms along with compression device control functions and algorithms as described herein. Thus, main controller 18 also includes memory 74 for storing software, variables, calculated values, and the like as is known in the art.

Figure 6:
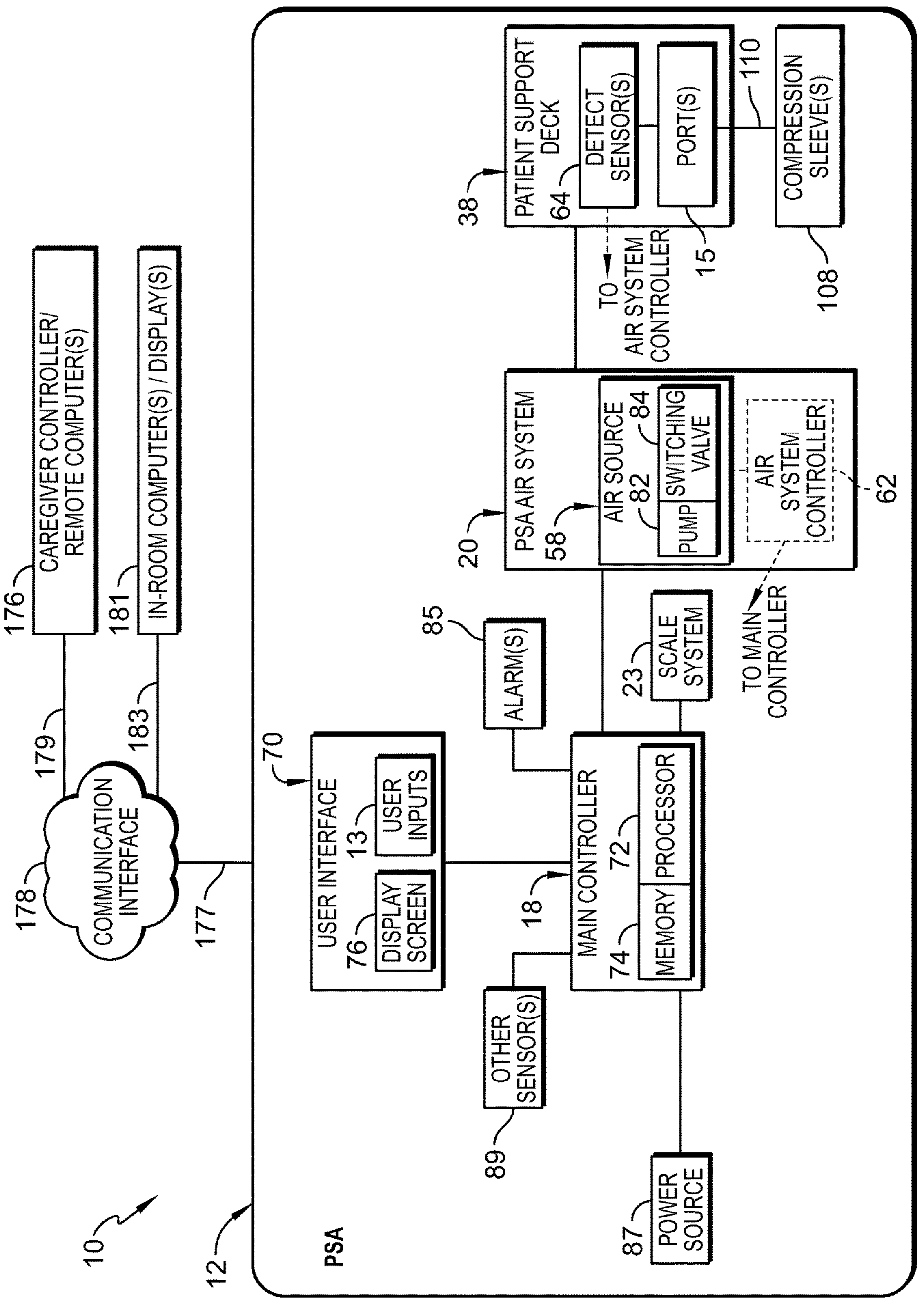
FIG. 6 is a block diagram showing the electric and communication components of the bed of FIG. 1 and showing the compression sleeve(s) and conduit in communication with an air system controller configured to communicate with a main controller of the patient support apparatus.

As shown diagrammatically in FIG. 6, main controller 18 includes a processor 72 and a memory device 74 that stores instructions and/or algorithms used by processor 72. Processor 72 executes the instructions and algorithms stored in memory 74 to perform the various bed control functions and algorithms along with SCD assembly 14 functions and algorithms described herein.

Main controller 18 is further configured to be in communication with user interface 70. User interface 70 is configured to receive user inputs by the caregiver and/or patient, to communicate such input signals to main controller 18 of patient support apparatus 12 to control the operation of air system 20 and SCD assembly 14 of patient support apparatus 12, and to control the operation of other functions of patient support apparatus 12. User interface 70 is further configured to provide access to air system controller 62 to control operation of SCD assembly 14 from user interface 70. User interface 70 may be formed as a graphical user input (GUI) or display screen 76 coupled to a respective siderail 78 as shown in FIGS. 1 and 2. Display screen 76 is coupled to main controller 18 as shown diagrammatically in FIG. 6. In some embodiments, two GUI's 76 are provided and are coupled to head siderails 78. Alternatively or additionally, one or more GUI's are coupled to foot siderails 80 and/or to one or both of the headboard 46 and footboard 45. Alternatively or additionally, GUI 76 is provided on a hand-held device such as a tablet, phone, pod or pendant that communicates via a wired or wireless connection with main controller 18.

As such, main controller 18 is configured to act on information provided by user interface 70 to control air system 20 based on inputs from a user. For example, user interface 70 includes a user input device (not shown) that is indicative of when a user wishes to actuate therapy of SCD assembly 14. The user input device corresponds to sequential compression of SCD assembly 14. Similarly, the user input device provides a signal to main controller 18 that therapy provided by SCD assembly 14 is to be halted when the user input device provides a signal indicative of a user's desire to stop sequential compression of SCD assembly 14. As such, user input devices may signal/indicate that the sequential compression of the respective SCD assembly 14 is to be actuated and/or ceased.

In some embodiments, main controller 18 of patient support apparatus 12 communicates with a caregiver controller/remote computer device 176 via a communication infrastructure 178 such as a wired network of a healthcare facility in which patient support apparatus 12 is located and/or via communications links 177, 179 as shown diagrammatically in FIG. 6. Infrastructure 178 may be operated according to, for example, wired and/or a wireless links. Caregiver controller 176 is sometimes simply referred to as a "computer" or a "server" herein. In some embodiments, main controller 18 of patient support apparatus 12 communicates with one or more in-room computers or displays 181 via communication infrastructure 178 and communications link 183. In some embodiments, display 181 is an in-room station or a nurse call system.

Remote computer 176 may be part of a bed data system, for example. Alternatively or additionally, it is within the scope of this disclosure for circuitry (not shown) of patient support apparatus 12 to communicate with other computers 176 and/or servers such as those included as part of an electronic medical records (EMR) system, a nurse call system, a physician ordering system, an admission/discharge/transfer (ADT) system, or some other system used in a healthcare facility in other embodiments, although this need not be the case.

In the illustrative embodiment, patient support apparatus 12 has a communication interface which provides bidirectional communication via link 177 with infrastructure 178 which, in turn, communicates bidirectionally with computers 176, 181 via links 179, 183 respectively as shown in FIG. 6. Link 177 is a wired communication link in some embodiments and is a wireless communications link in other embodiments. Furthermore, communications links 179, 183 each comprises one or more wired links and/or wireless links as well, according to this disclosure. Remote computer

176 may be part of a bed data system, for example. Alternatively or additionally, it is within the scope of this disclosure for the circuitry of patient support apparatus 12 to communicate with other computers 176 and/or servers such as those included as part of the EMR system, a nurse call system, a physician ordering system, an admission/discharge/transfer (ADT) system, or some other system used in a healthcare facility in other embodiments, although this need not be the case.

Still referring to FIG. 6, main controller 18 is in communication with a scale system 23 coupled to frame 21 that may be operable to determine a weight of the patient positioned on patient support apparatus 12. Main controller 18 may vary an operating parameter of therapy system 10 depending upon the weight of the patient sensed by scale system 23. Scale system 23, using load cells, is used to detect the weight of a patient positioned on the patient support apparatus 12, movement of the patient on patient support apparatus 12, and/or the exit of the patient from patient support apparatus 12. Other sensors may be used in conjunction with or as an alternative to the load cells of the scale system 23, including, for example, force sensitive resistors (FSRs) that are placed beneath the mattress 22 of the patient support apparatus 12 on the patient support deck 38.

As shown in FIG. 6, patient support apparatus 12 has one or more alarms 85. Such alarms 85 may be one or more audible alarms and/or visual alarms coupled to the circuitry. Audible alarms 85 include, for example, a speaker, piezoelectric buzzer, or the like. The circuitry controls audible alarms 85 to sound in response to various alarm conditions detected. Visual alarms 85 include, for example, one or more alert lights that are provided on frame 21 of patient support apparatus 12 and that are activated in different ways to indicate the conditions of patient support apparatus 12. For example, when no alerts or alarms exist, the lights are activated to shine green. When an alert or alarm occurs, including a bed exit alarm, lights are activated to shine red or amber and, in some embodiments, to blink. Other visuals alarms that may be used in addition to, or instead of, such alert lights include changing a background color of graphical display screen 76 and/or displaying an iconic or textual alarm message on display screen 76 and may even include IV pole mounted or wall mounted devices such as lights and/or graphical display screens.

It should be understood that FIG. 6 is diagrammatic in nature and that various portions of patient support apparatus 12 and the circuitry thereof is not depicted. However, a power source block 87 is intended to represent an onboard battery of patient support apparatus 12 and an AC power cord of patient support apparatus 12 as well as the associated power handling circuitry. Also, the block representing other sensors 89 represents all other sensors of patient support apparatus 12 such as one or more sensors 64 used to sense whether a caster braking system of patient support apparatus 12 is in a braked or released position and/or sensors 89 used to detect whether each of the siderail assemblies 78, 80 is raised or lowered, or other sensors as known in the art.

As discussed above, main controller 18 includes a processor 72 and a memory device 74 that stores instructions used by processor 72 as shown in FIGS. 3 and 4. Processor 72 may further consider information gathered from sensors 64, air system controller 62, and SCD assembly 14 to determine when to actuate, adjust, or cease the sequential compression. Illustratively, such sensors 64 are embodied as pressure sensors 64 although it may be embodied as other sensors known in the art used either alone or in combination with pressure sensors 64.

Further, memory device 74 may be pre-programmed to alert the caregiver upon exceeding a predetermined threshold so to avoid patient discomfort, pressure necrosis, and/or loss of capillary integrity leading to edema and increased compartmental pressures. To explain, memory device 74 may be configured to alert the caregiver of a pressure of SCD assembly 14 which exceeds a predetermined threshold pre-programmed therein.

Such a predetermined threshold of pressure may be based on the patient's vitals, medical history, desired outcome of pneumatic therapy (i.e.: sequential compression therapy via SCD assembly 14), as well as other data measurements by sensors 64. Therefore, it is desirable to identify the sequential compression threshold of each patient and avoid reaching such a threshold to avoid patient discomfort, pressure necrosis, and other associated complications.

Figure 5:
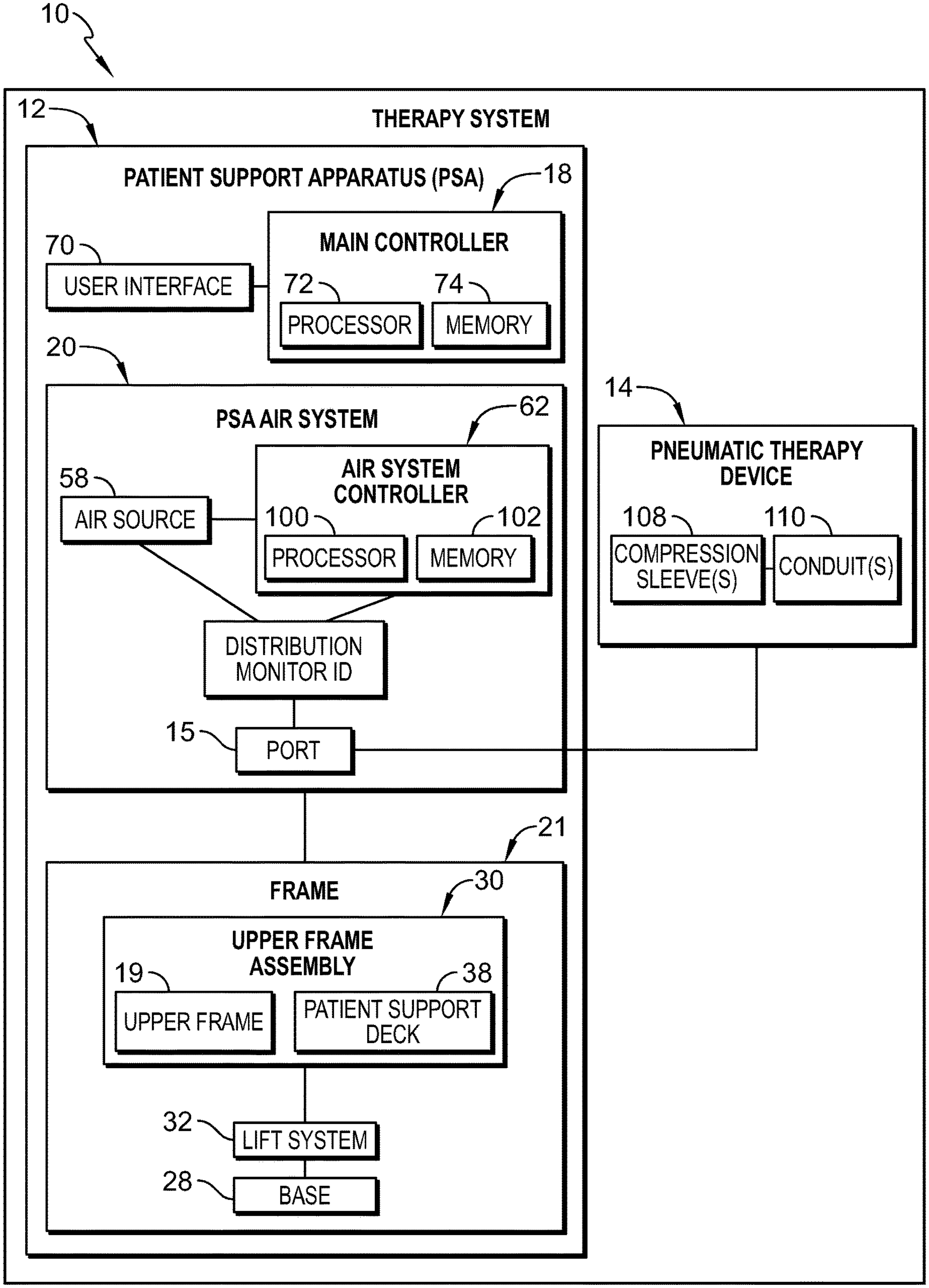
FIG. 5 is a block diagram showing the pneumatic components of the bed of FIG. 1 and showing the pneumatic therapy device of FIG. 2 in communication with the air system of the patient support apparatus.

As mentioned previously, the operation of SCD assembly 14 is controlled by main controller 18 in communication with air system 20. Main controller 18 is configured to communicate with an air source 58, 258 and a respective distribution manifold/outlet 60, 260. While only air source 58 is shown in FIG. 5, it should be understood that the operation described herein will be equally applicable to other embodiments using similar structures.

In other embodiments, as shown in FIG. 2, portions of air system 20 are illustratively located within mattress 22 and is configured to supply and direct a pressured air stream to SCD assembly 14. Air system 20 includes a source of pressurized air 58, a distribution manifold 60, and an air system controller 62. Source of pressurized air 58 is configured to generate and communicate a pressurized air stream to SCD assembly 14 through distribution manifold 60 located in mattress 22 and a plurality of tubes 27 extending therebetween. A plurality of air hoses 59 are coupled to distribution manifold 60 and extend between distribution manifold 60 and edge 61 of mattress 22 terminating in a port 15. Plurality of tubes 27, distribution manifold 60, and plurality of air hoses 59 cooperate to guide the pressurized air stream from source of pressurized air 58 to SCD assembly 14. Distribution manifold 60 is formed to include a plurality of valves 63 and a plurality of pressure sensors 64 and is configured to adjust the pressure of the air from the source of air 58 before it enters pneumatic therapy device 14. Air system controller 62 is in communication with main controller 18, source of pressurized air 58, and distribution manifold 60 and is operable to detect connection of SCD assembly 14 to port 15, communicate detection of connection to main controller 18, and initiate operation of therapy system 10 in response to the communication. The detection of SCD assembly 14 may be accomplished by an at least one pressure/attachment sensor 64 configured to identify attachment of SCD assembly 14 to port 15.

In other embodiments of patient support apparatus 12, as shown in FIGS. 1 and 3, air system 220 is illustratively coupled to frame 21 underneath a head end 41 of upper frame assembly 30 and is configured to supply and direct a pressured air stream to SCD assembly 14. Air system 220 includes a source of pressurized air 258, a distribution manifold 260, and an air system controller 62. Source of pressurized air 258 is configured to generate and communicate a pressurized air stream to SCD assembly 14 through distribution manifold 260 coupled to frame 21 and a plurality of tubes 227 extending between the source of pressurized air 258 and the distribution manifold 260. A plurality of air hoses 259 are coupled to distribution manifold 260 and extend between distribution manifold and edge 231 of patient support deck 238 terminating in a port 15. Plurality of tubes 227, distribution manifold 260, and plurality of air hoses 259 cooperate to guide the pressurized air stream from source of pressurized air 258 to SCD assembly 14. Distribution manifold 260 is formed to include a plurality of valves 63 and a plurality of pressure sensors 64 and is configured to adjust the pressure of the air from the source of air 258 before it enters pneumatic therapy device 14. Air system controller 62 is in communication with main controller 18, source of pressurized air 258, and distribution manifold 260 and is operable to detect connection of SCD assembly 14 to port 15, communicate detection of connection to main controller 18, and initiate operation of therapy system 10 in response to the communication. The detection of SCD assembly 14 may be accomplished by an at least one pressure/attachment sensor 64 configured to identify attachment of SCD assembly 14 to port 15.

In other embodiments of patient support apparatus 12, as shown in FIG. 4, air system 320 is formed independent of patient support apparatus 12 and is removeably coupled to footboard 45 of patient support apparatus 12 and is configured to supply and direct a pressured air stream to SCD assembly 14 coupled thereto. Air system 320 includes a source of pressurized air (not shown), a distribution manifold (not shown), and an air system controller 62. Source of pressurized air and distribution manifold are located in a housing 340 and configured to generate and guide a pressurized air stream a port 15 formed in a side 361 of the housing 340. Housing 340 is formed to removeably couple to footboard 345 using clips 351, hooks 351, or other mechanisms known in the art. Air system 320 is further configured to couple to footboard 345 for power such that the source of air located in housing 340 draws power from patient support apparatus 12.

In some embodiments, the air system 320 further includes a plurality of tubes shown in phantom (not shown) extending between the housing 340 and a port coupled to the frame of the patient support apparatus 12. The plurality of tubes cooperate to guide the pressurized air stream from source of pressurized air from the patient support apparatus 12 to the air system 320. In such an embodiment, the air system 320 does not have an independent source of pressurized air, but receives pressurized air from the patient support apparatus 12 and controls the operation of the sleeves 108. In some embodiments, the air system 320 may be independent of the main controller 18 of the patient support apparatus 12. In other embodiments, the air system 320 may be in electrical communication with the main controller 18 and cooperate with the user interface 76 to allow control of the air system 320 from the user interface 76. The detection of SCD assembly 14 may be accomplished by an at least one pressure/attachment sensor 64 configured to identify attachment of SCD assembly 14 to port 15.

Source of pressurized air 58, 258 is in communication with main controller 18 and air system controller 62 and coupled to distribution manifold 60, 260 as shown in FIGS. 2, 3, and 4. In FIGS. 1-3, source of pressurized air 58, 258 is illustratively embodied as a compressor of patient support apparatus 12 such that air system 20, 220 shares air source 58, 258 with patient support apparatus 12 as well as with other therapy systems 14 coupled thereto. In utilizing a single source of pressurized air 58, 258 for functions of patient support apparatus 12 and air system 20, 220, therapy system 10 reduces the clutter of a second, distinct source of pressurized air commonly associated with SCD assemblies 14 and configured to operate solely with SCD assembly 14 and/or other modular therapies. As such, in some contemplated embodiments, wherein mattress 22 is an air mattress that contains one or more air bladders or layers (not shown), air system 20, 220 may be configured to control inflation and deflation of the various air bladders or cells and/or layers of air mattress 22 as well as SCD assembly 14. Source of pressurized air 58, 258 may be embodied as a fan, a blower, or any other source as is known in the art configured to provide pressurized.

In the embodiments shown in FIG. 1-3, source of pressurized air 58, 258 is coupled to frame 21 at base 28 and is further coupled to a plurality of tubes 27, 227 such that the pressurized air produced in source 58, 258 may be guided into air hoses 59, 259. In some embodiments, plurality of tubes 27, 227 may be those already coupled to patient support apparatus 12 and extending between the bed blower/compressor 58, 258 and the patient support apparatus 12. In other embodiments, the plurality of tubes 27,227 extends from the air source 58, 258, up lift system 32, along upper frame assembly 30, and terminates at distribution manifold 60, 260. From distribution manifold 60, 260, air hoses 59, 259 are routed to port 15 formed in each of the pair of sides 61 of mattress 22 and/or edges 231 of deck 238. Illustratively, at least two air hoses 59, 259 are routed to each of the pair of edges/sides 231, 61, terminate at a port 15, 215 formed in each of the edges/sides 231, 61. Illustratively, a port 15 is formed in the foot section 44 of each side 61 of mattress 22 and/or the foot section 54 of each edge 231 of deck 238. Port 15 is configured to couple to SCD assembly 14 and, thereby, guide pressurized air into SCD assembly 14 during therapy. Illustratively, port 15 is formed to include a plurality of apertures/valves 16. Each aperture/valve 16 is configured to couple to a single SCD assembly/therapy module 14 such that each port 15 is configured to couple to multiple SCD assemblies 14/therapy modules 14.

As shown in FIG. 6, source of pressurized air 58, 258 includes a pump 82 and a switching valve 84. Pump 82 is coupled to switching valve 84 and configured to draw ambient atmospheric air into air source 58, 258, and exhaust air into the atmosphere. Switching valve 84 is exposed to the atmosphere and configured to either provide for or block the air into and out of air source 58, 258. Pump 82 includes an inlet (not shown) and an outlet (not shown) coupled to switching valve 84 and is configured to cooperate with switching valve 84 is create a flow path for the air. Switching valve 84 includes a plurality of outlets (not shown) coupled to the inlet of pump 82 and a second inlet (not shown) coupled to the outlet of pump 82. At least one outlet of switching valve 84 is open to the atmosphere to provide the flow path for drawing air into air source 58, 258 or exhausting air to the atmosphere depending on the position of switching valve 84.

Distribution manifold 60, 260, 360 (not shown) is operable to close the plurality of valves 63 to maintain the pressure in SCD assembly 14. Illustratively, valves 63 are embodied as solenoid valves. Manifold 60, 260 may also selectively control venting of the SCD assembly 14 to an exhaust (not shown). Illustratively, distribution manifold 60, 260 guides pressurized air stream towards port 15. Port 15 is configured to couple to a single SCD assembly/therapy module 14 such that each port 15 is configured to couple to multiple SCD assemblies 14/therapy modules 14. Illustratively, each port 15 is configured to couple to two SCD assemblies 14 such that each port 15 is configured to operate independently of the other. In some embodiments, additional ports 15 are formed in patient support apparatus 12 and configured to couple to additional SCD assemblies and/or other therapy devices 14. Distribution manifold 60, 260 is in communication with air system controller 62 and configured to operate in response to commands from air system controller 62 and/or main controller 18.

As such, upon receiving an input from user interface 70, main controller 18 communicates the appropriate signal(s) to air system controller 62 to control air system 20. Therefore, when a function is requested by main controller 18, air system controller 62 is configured to energize the appropriate valve of manifold 60, 260 and set the appropriate pulse width modulation for source of pressurized air 58, 258. Illustratively, ambient, environmental air enters air system 20, 220 through an inlet air filter (not shown). The ambient air travels into source of pressurized air 58 through an inlet orifice (not shown). Source of pressurized air 58, 258 then pushes the pressurized air produced therein through a discharge hose (not shown) into an inlet (not shown) of manifold 60, 260 through manifold 60, 260 and plurality of tubes 27, 227 coupled thereto, and to SCD assembly 14 and/or appropriate bladders positioned within mattress 22, 322.

Illustratively, pressurized air is guided into conduit 110 of SCD assembly 14 through port 15. Conduit 110 guides the pressurized air into compression sleeve 108 via a pneumatic connector 115 formed in an outer surface 141 of sleeve 108. Illustratively, each sleeve 108 is formed to include a pressure tap (not shown) in communication with air system 20. The pressure taps are routed to manifold 60 and coupled to a plurality of pressure sensors 64 through sense lines through air system controller 62 for feedback of pressure levels within SCD assembly 14. For example, if pressure in sleeve(s) 108 exceeds a threshold pre-programmed in main controller 18, pressure sensors 64 sense the sleeve(s)' 108 pressure, provide feedback to main controller 18, and the main controller 18 communicates with air system controller 62 to adjust the pressure of sleeve(s) 108 accordingly. The aforementioned system is closed-loop and feedback dependent.

Illustratively, sensors of sensor block 89, such as, for example, Hall-effect sensors, RFID sensors, near field communication (NFC) sensors, pressure sensors, or the like, are configured to sense tokens (e.g., magnets, RFID tags, NFC tags, etc.). Illustratively, the type/style of sleeve 108 is sensed by sensors 89 and communicated to main controller 18 which, in turn, communicates the sleeve 108 type information to the circuitry for ultimate display on GUI 76 in connection with the compression device control screens. Illustratively, pressure sensors 64 are configured to identify the presence and absence of conduit 110 and, in response, automatically begin, halt, or adjust therapy, respectively, which is discussed in further detail below.

The aforementioned sensed pressure corresponds to the output of source for pressurized air 58, 258. As such, air system controller 62 is configured to regulate the speed of source of pressurized air 58, 258 in correlation to pressure. For example, if a pre-programmed threshold requires a particular discharge from source of pressurized air 58, 258 for function of SCD assembly 14, then main controller 18 is configured to communicate to air system controller 62 so that the appropriate pulse width modulation settings are fixed so to establish the correct pressure and flow output from source of pressurized air 58, 258.

Air system controller 62 includes a processor 100 and a memory device 102 which stores instructions used by processor 100 as shown in FIG. 5. In some embodiments, processor 100 may consider information gathered from pressure sensors 64 and/or SCD assembly 14 to determine when to provide pressure to SCD assembly 14 such that sequential compression may occur. As discussed above, in some embodiments, main controller 18 is in communication with air system controller 62 such that upon reaching a predetermined pressure threshold, a signal is sent first from pressure sensors 64 to main controller 18 and then communicated to air system controller 62. In some embodiments, air system controller 62 itself is pre-programmed to identify pressure exceeding a preprogrammed threshold and is further configured to convey such information to main controller 18. Illustratively, air system controller 62 and main controller 18 are configured to cooperate to alert the caregiver when the pressure of SCD assembly 14 exceeds the pre-programmed threshold.

As discussed above, SCD assembly 14 is configured to provide sequential compression therapy to a patient positioned on patient support apparatus 12 as shown in FIG. 1. SCD assembly 14 is removeably coupled to distribution manifold 60 and is configured to contain the pressurized air stream such that the pressure thereof may be applied to the patient via SCD assembly 14. SCD assembly 14 includes at least one compression sleeve 108 and at least one conduit 110 having a first end 112 removeably coupled to compression sleeve 108 and a second end 113 removeably coupled to port 15. In the illustrative embodiment, sleeve 108 is formed to fit a patient's lower leg. In other embodiments, the sleeve 108 may be formed to fit a patient's foot, calf, thigh, or some combination thereof. Conduit 110 is configured to extend between sleeve 108 and distribution manifold 60 such that the pressurized air stream formed by source of pressurized air 58 is directed from source 58 through distribution manifold 60 and further through conduit 110 until reaching sleeve 108. As such, when sleeve 108 is positioned on a lower extremity of the patient, SCD assembly 14 is configured to provide each lower extremity of the patient with therapy independent of the other. Further, main controller 18 may be configured to selectively inflate a first compression sleeve 108 independent of a second compression sleeve 108 such that the second compression sleeve 108 remains uninflated throughout the duration of therapy. Illustratively, each sleeve 108 has a respective conduit 110 coupled thereto and is independent of the other. In some embodiments, a single conduit 110 is shared between multiple sleeves 108.

As such, sleeves 108 are configured to adjust the amount of compression applied to the patient in response to instructions from main controller 18 and/or air system controller 62. Specifically, sleeves 108 are configured to respond to user inputs including, for example, the target pressure to which each sleeve 108 is to be inflated by air system 20 and/or the desired zone(s) (i.e.: foot zone, calf zone, thigh zone, or some combination thereof) of each sleeve 108 to be inflated by air system 20 if sleeve 108 has multiple zones. The selectable therapy settings further include, for example, the frequency of compression, the duty cycle of the compression cycles, the number of cycles, the time period over which the compression therapy is to take place, or some combination thereof. In some embodiments, the selectable therapy settings include selection of pressure versus time curves (e.g., step up and/or step down curves, ramp up and/or ramp down curves, saw tooth curves, and the like) as well as the parameters for the various types of curves (e.g., pressure setting at each step, duration of each step, duration of ramp up, duration of ramp down, and the like).

Looking to FIGS. 1-4, and as discussed above, compression sleeves 108 are formed to include pneumatic connector 115. Connector 115 is coupled to an outer surface 141 of sleeve 108 and configured to couple conduit 110 thereto. Illustratively, connector 115 extends away from sleeve 108 a distance to reduce the likelihood of long-term contact between conduit 110 and the patient which otherwise results in patient discomfort. In such embodiments, connector 115 may be formed as a pigtail pneumatic connector 115. A pigtail pneumatic connector 115 is formed to couple sleeve 108 and conduit 110 and is extends the length of connector 115 such that conduits 110 are spaced apart from the patient at a greater distance than a non-pigtail pneumatic connector 115. To further avoid patient discomfort resulting from prolonged patient contact with conduits 110, in some embodiments, pneumatic connector 115 includes an outer shell (not shown) formed from a pliable material. In other embodiments, pneumatic connector 115 includes an inner shell (not shown) formed from a rigid material and an outer cover (not shown) encompassing the inner shell and formed from a pliable material.

As shown in FIGS. 1-4, conduit(s) 110 are configured to removeably couple to port 15 and may be embodied as tubes and/or hoses. As such, conduit(s) 110 are configured to extend between port 15 and sleeve(s) 108 and are formed to receive pressurized air from air system 20, 220. Illustratively, at least one port 15 is formed for coupling SCD assembly to air system 20, 220. In some embodiments, multiple ports 15 may be formed for coupling. Ports 15 are formed to configure to tubes 59, 259 and to couple to SCD assembly 14, thereby conveying the stream of pressurized air from air source 58, 258 to SCD assembly 14. In coupling conduit 110 and distribution manifold 60, 260, port 15 configures conduit 110 to guide stream of pressurized air towards sleeve 108. Illustratively, each of a pair of compression sleeves 108 is configured to couple to a respective first end 112 of each of a pair of conduits 110 such that each compression sleeve 108 is configured to provide sequential compression to a lower extremity of the patient. In some embodiments, a multi-port connector (not shown) is provided at second end 113 of conduits 110 to permit simultaneous attachment of multiple conduits 110 to associated coupler(s) (not shown).

Illustratively, main controller 18 is further operable to determine the presence of conduit 110 at port 15. Port 15 is thereby accessible by a caregiver when the patient is positioned on the mattress 22 and configured to couple to multiple SCD assemblies 14. Illustratively, a plurality of SCD assemblies 14 may be removeably coupled to port 15. Further, in embodiments having a plurality of ports 15, each port 15 is configured to couple to SCD assemblies 14 independent of a second port 15. Further, each of the plurality of ports 15, are similarly configured. Additionally, and as discussed above, upon identifying the presence of conduit 110 removeably coupled to port 15, main controller 18 is configured to initiate sequential compression therapy upon identifying the removal of conduit 110 from port 15.

A caregiver may also initiate/terminate therapy by using user interface 70 and inputting the desired action. As such, a particular zone/combination of zone and sleeves 108 may be selected by the caregiver using user interface 70 via user inputs 13. For example, buttons 13 for selection by a user of left and/or right foot sleeves, left and/or right calf sleeves, left and/or right thigh sleeves, or left and/or right combination sleeves such as those described above appear on display screen 76, in some embodiments. It should be appreciated that the compression sleeve 108 on a patient's left leg may be of a different type than that on the patient's right leg. Alternatively or additionally, main controller 18 is operable to determine which type of sleeve 108 is connected to each port 15 based on the time it takes to inflate the particular sleeve 108 to a target pressure as measured by pressure sensors 64. After main controller 18 makes the sleeve type determination for the one or more sleeves 108 coupled to port(s) 15, such information is displayed on GUI 76.

Main controller 18 is illustratively configured to automatically communicate to air system controller 62 to stop therapy in response to a signal from sensors 64 conveying a disconnection of conduits 110 and ports 15. Sensors 64 may be in communication with main controller 18 and are configured to convey data concerning conduit 110. Both the removal/presence of conduit 110 may be determined in a single algorithmic step due to the integral relationship of the presence/absence of conduit 110 at port 15. In some embodiments, sensors 64 are configured to determine the removal of conduit 110 from port 15 and signal to air system controller 62 the removal of conduit 110. Air system controller 62 may then stop the creation/conveyance of pressurized air flow to SCD assembly 14, thereby removing main controller 18 from the method of use for the additional embodiment.

In some embodiments, upon main controller receiving the data from sensors 64 identifying the presence of conduit 110 at port 15, main controller communicates with scale system 23 which detects the presence of SCD assembly 14 and zeros the scale to zero pounds. This avoids discrepancies in patient weight due to the weight of SCD assembly 14 and is done automatically such that the caregiver does not have to remember to zero the patient support apparatus 12 before measuring the weight of the patient positioned on bed 1.

In some embodiments, the removal of pneumatic therapy device 14 and the associated data is communicated to the main controller 18. Such associated data may include, but is not limited to, the location of pneumatic therapy source 14. This data may then be conveyed between main controller 18 to a wall unit (not shown) and further communicated between the wall unit and a nurse station (not shown).

As discussed above, when SCD assembly 14 is coupled to air system 20, 220, air system 20, 220 senses the presence of SCD assembly 14 and begins the transmission of power and/or pressurized air between SCD assembly 14 and air system 20, 220. Illustratively, such transmission of pressurized air is conveyed through a wired connection to SCD assembly 14. Whereas the transmission of power may be completed wirelessly, illustratively. In other embodiments, the transmission of power may be conveyed through a wired connection. In some embodiments, air system 20, 220 continuously generates the pressurized air stream upon coupling to SCD assembly 14, thereby causing SCD assembly 14 to maintain a desired level of pressure within SCD assembly 14. In other embodiments, air system 20, 220 is preprogrammed to generate pressurized air in cycles, waves, and/or any other desired patterns. In still other embodiments, main controller 18 and air system 20, 220 are in communication such that air system 20, 220 is configured to move between a plurality of pre-programmed patterns in response to user input or automatically in response to sensed pressure values of SCD assembly 14 exceeding a predetermined threshold. Main controller 18, sensors 64, and air system 20, 220 are in communication and further configured to identify the removal of the SCD assembly 14 and, illustratively, stop production of the pressurized air stream within the air system 20, 220.

Therefore, upon identification of SCD assembly 14 coupling to air system 20, 220, air system 20, 220 communicates such coupling to main controller 18. Main controller 18 is configured to communicate with user interface 70 such that user interface 70 is updated to control operation of SCD assembly 14 by allowing access to air system 20, 220 via user interface 70. Such access allows for a caregiver to input/receive patient data at a centralized location on patient support apparatus 12. Illustratively, user interface 70 is configured to alert the caregiver upon disconnection of SCD assembly 14 and air system 20, 220 and/or other interruptions to the therapy therein provided.

In further embodiments, conduit 110 is formed as a pneumatic conduit and is made of an elastic, non-porous material configured to expand in length when pressurized with air. Such elastic, non-porous material is configured to move between an extended length (not shown) and a storage length (not shown) in response to the presence of pressurized air therein. Storage length has a distance measuring less than a distance of extended length, and, as such, storage length has a surface area measuring less than a surface area of extended length. At rest, pneumatic conduit has the storage length. Upon actuation of source of pressurized air 58, 258, pneumatic conduit reacts to the presence of pressurized air by increasing the length and surface area of pneumatic conduit. As such, so long as the pressurized air is directed into pneumatic conduit, pneumatic conduit will maintain the extended length. Therefore, a production and direction of the majority of the pressurized air into conduit is to be ceased before conduit returns to storage length. This permits conduit to be stored in a variety of manners due to the decreased length and surface area of conduit.

In other embodiments in which conduit 110 is formed as a pneumatic conduit, pneumatic conduit is configured to include a break away coupler (not shown). Break away coupler may be positioned between sleeve 108 and conduit 110 and/or between a first conduit section extending between sleeve 108 and break away coupler and a second conduit section extending between break away coupler and second end of conduit. Break away coupler is configured to disconnect from conduit 110 when longitudinal forces in line with conduit 110 exceed a pre-determined breaking force of coupler. The force needed to decouple coupler and conduit 110 is substantially greater than the longitudinal force created by the pressurized air within conduit 110 during operation of SCD assembly 14 and/or other therapies. As such, actuation of SCD assembly 14 does not cause coupler to break away from conduit 110 unless such force exceeds the breaking force of coupler. Further, the breaking force is substantially less than the force exerted upon conduit 110 by a leg of the patient when conduit 110 creates a fall risk. Break away coupler, therefore, is configured to break away from conduit 110 in response to the patient tripping over conduit 110, thereby resulting in a cessation of therapy until coupler is reattached to conduit 110. As such, upon main controller 18 ceasing production of pressurized air and the caregiver removal of SCD assembly 14 and SCD assembly 14 is decoupled from port 15.

Figure 7:
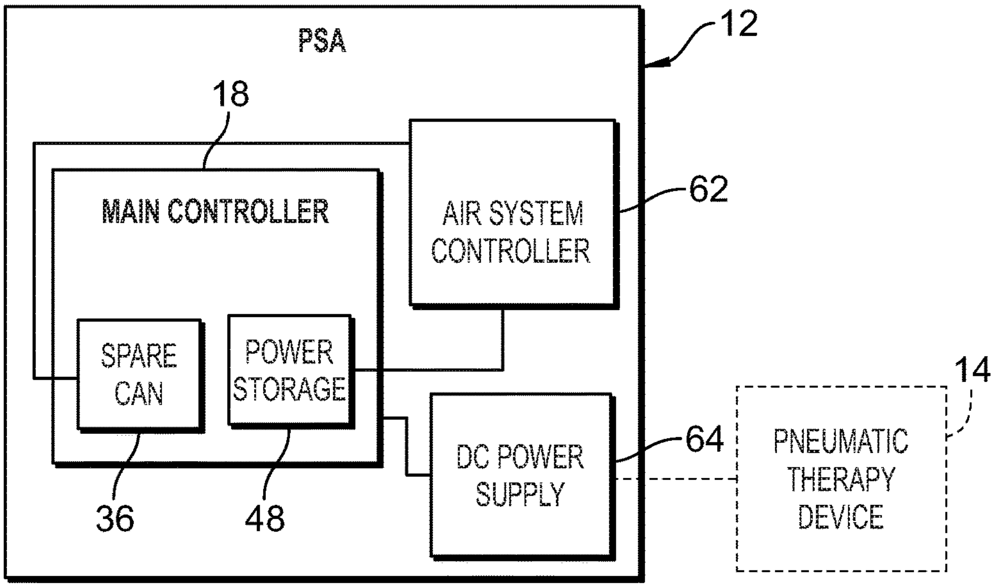
FIG. 7 is a block diagram of another embodiment of a patient support apparatus similar to FIG. 1, the embodiment of FIG. 7 having the main controller coupled to a DC power supply configured to couple to the pneumatic therapy device.
Figure 8:
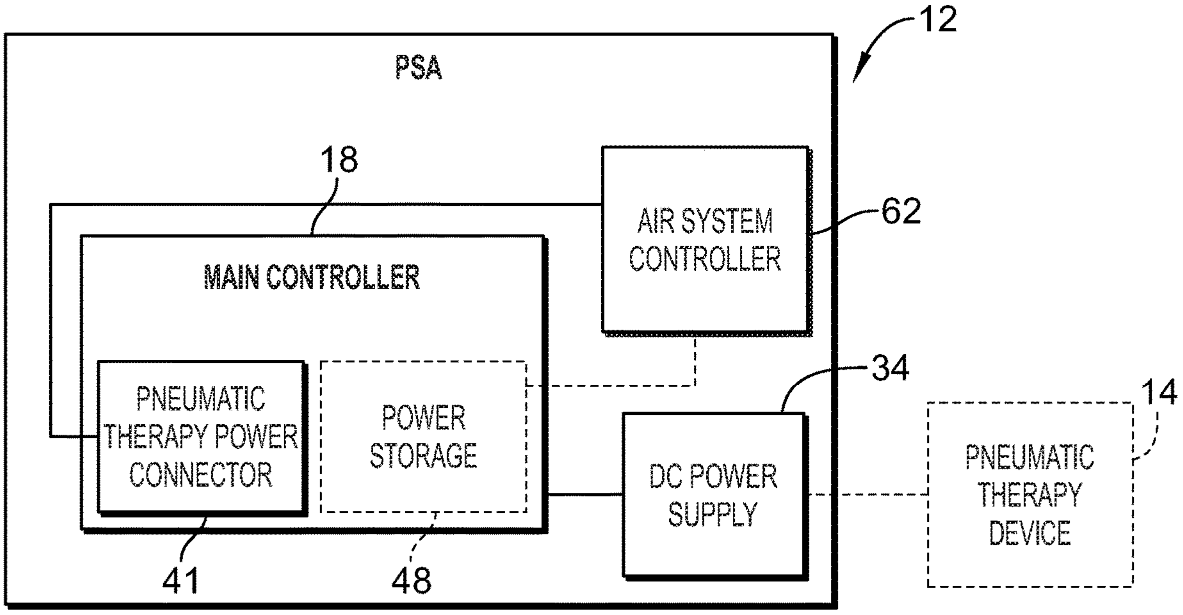
FIG. 8 is a block diagram of another embodiment of a patient support apparatus similar to FIG. 1, the embodiment of FIG. 8 having the main controller coupled to a DC power supply and having a pneumatic therapy power connector formed therein.

In other embodiments, patient support apparatus 12 is formed to include a direct current (DC) power supply 34 as shown in FIGS. 7 and 8. Illustratively, the power supply 34 is coupled to the upper frame assembly 30 and configured to provide power directly to pneumatic therapy device 14. Such raw DC power may be accessed from main controller 18. As shown in FIG. 7, main controller 18 may be formed to include a spare CAN bus 36 and a power storage component 48 in communication with the air system controller 62. Illustratively, the communications connectivity between the pneumatic therapy device 14 and the patient support apparatus 12 may be accomplished by a spare CAN bus 36, as shown in FIG. 7, or pneumatic therapy power connector SCD RS-485 41, as shown in FIG. 8. Power and information may be communicated between the pneumatic therapy device 14 and patient support apparatus 12 and directly provided to the caregiver. Such information may include patient status and fault modes of the patient support apparatus 12.

Figure 9:
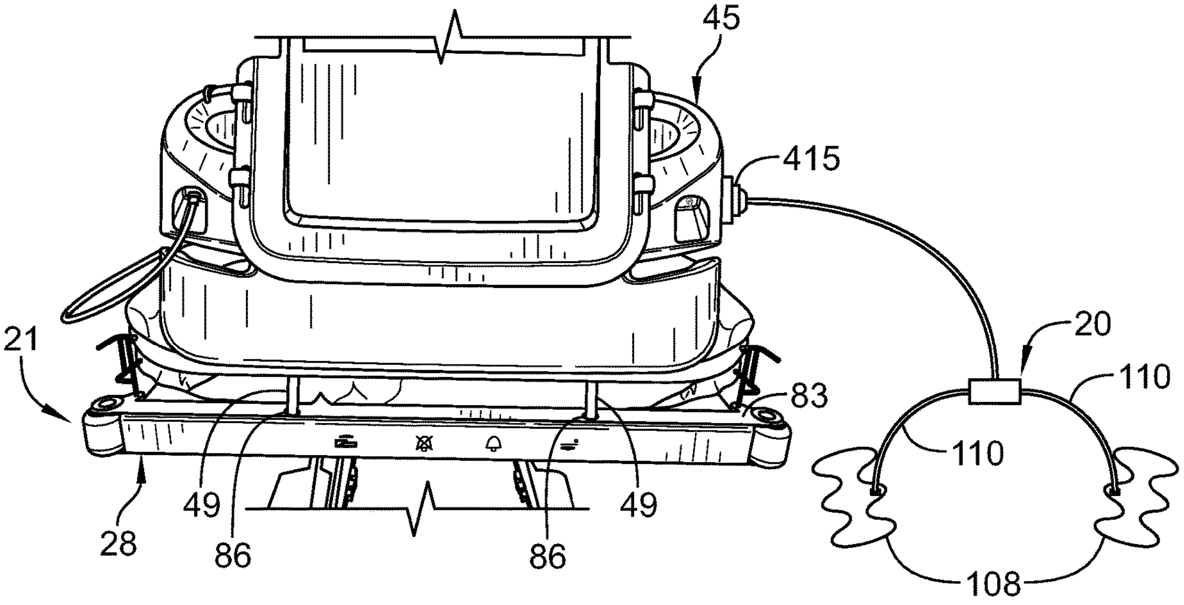
FIG. 9 is an elevation view of another embodiment of a patient support apparatus similar to FIG. 1, the embodiment of FIG. 9 having a footboard formed to include a port in at least one side of the footboard and configured to couple to and power the pneumatic therapy system.
Figure 10:
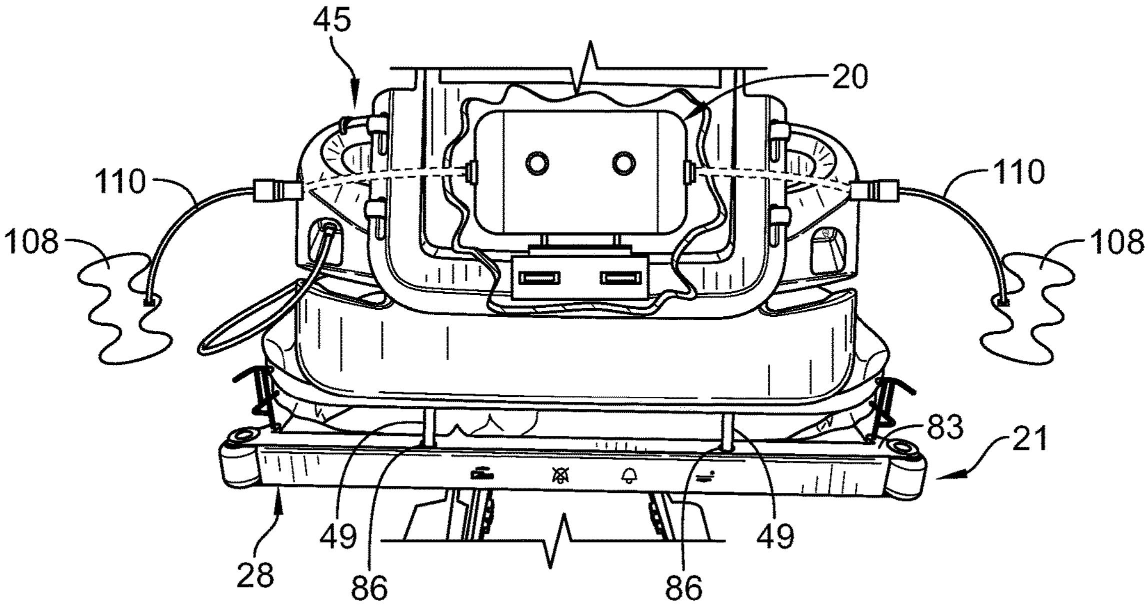
FIG. 10 is an elevation view of another embodiment of a patient support apparatus similar to FIG. 1, the embodiment of FIG. 10 having the footboard housing a source of air and formed to include a port formed in each side of the footboard and configured to couple to the conduits.

In some embodiments, footboard 45 is formed to include a pair of mounting pins 49 extending towards the upper frame assembly 30 and configured to provide raw DC power to air system 20, 220 coupled thereto as shown in FIGS. 9 and 10. Frame 21 includes a foot rail 83 positioned below footboard 45 and formed to have a pair of mounting holes 86 therein. Each of the mounting holes 86 is configured to receive one of the pair of mounting pins 49 and transmit power thereto. Illustratively, an inner surface (not shown) of the mounting holes 86 is formed from plastic and has metal contacts formed therein configured to make electrical contact with mounting pins 49 when placed therein. Illustratively, mounting pins 49 are formed from metal. One of the pair of mounting holes 86 is configured to convey +28 Volt DC Power and the other mounting hole 86 is configured to ground the electrical return.

As shown in FIG. 9, the power provided by footboard 45 may be conveyed to air system 20 coupled thereto at a port 415 formed in footboard 45. In other embodiments, as shown in FIG. 10, air system 20 may be located inside a footboard 45 and configured to receive power from the coupling of the footboard 45 to foot rail 83. As such, isolated DC power may be provided to pneumatic therapy device 14 without requiring alternating current (AC) power from an outlet.

In further embodiments, as shown in FIG. 4, air system 320 may be configured to couple to patient support apparatus 12, and receive power from the available DC power of patient support apparatus 12 or utilizing the bed battery (not shown). As such, pneumatic therapy device 14 may be powered using DC power at any time. If AC power is required, then the pneumatic therapy device 14 may be plugged into a wall outlet (not shown) or an auxiliary outlet (not shown) formed in patient support apparatus 12. Illustratively, patient support apparatus 12 is configured to provide DC power through direct wring between main controller 18 and air system 320. Using the same wiring, patient support apparatus 12 may provide DC power between the bed battery and the air system 320 when patient support apparatus 12 is not plugged directly into a power source. Illustratively, the power provided to air system 320 from patient support apparatus 12 is uninterrupted.

In other embodiments, main controller 18 is configured to communicate with sensors 64 to monitor the pressure within compression sleeve 108, determine if a pressure change has occurred, computer a desired therapeutic pressure unique to the patient, and apply the aforementioned therapeutic pressure upon the patient. Illustratively, this may be accomplished via the algorithm shown in FIG. 11.

Figure 11:
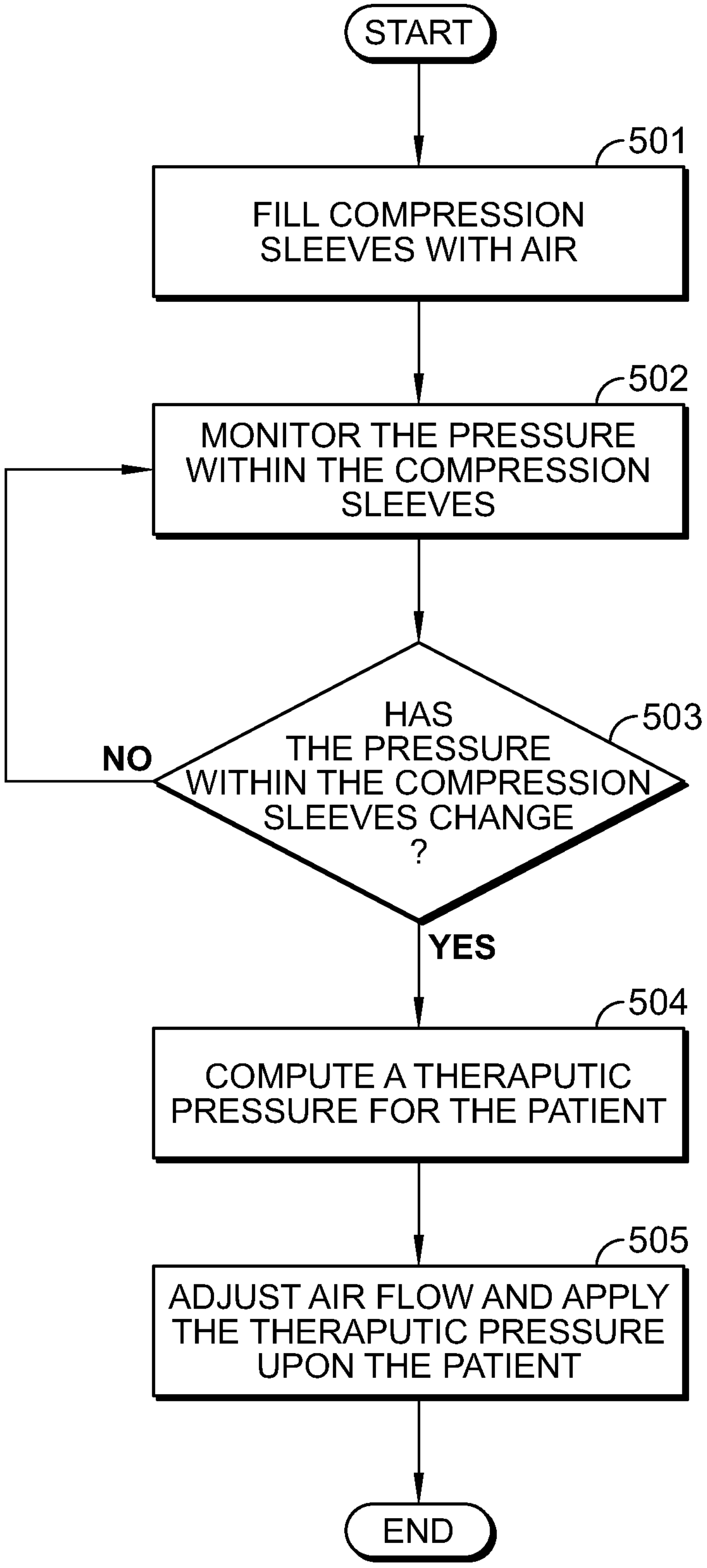
FIG. 11 is a flowchart showing an algorithm pre-programmed into the main controller configuring the main controller to monitor the pressure of the sleeve(s) and automatically adjust the pressure therein if a change in pressure occurs.

The algorithm as shown in FIG. 11 includes filling the compression sleeve(s) 108 with pressurized air from the air source 58, 258 at step 501. At step 502, the pressure within sleeve(s) 108 is monitored using sensors 64 coupled thereto and in communication with main controller 18. Sensors 64 are configured to determine the pressure within conduit 110 and convey such data to main controller 18 and/or air system controller 62. In some embodiments, when the signal from sensors 64 is conveyed to air system controller 62, air system controller 62 is configured to communicate the signal to main controller 18. At step 503, the main controller determines if the pressure within the sleeves 108 has changed. If so, the main controller 18 computes the therapeutic pressure unique to the patient at step 504 and applies the aforementioned therapeutic pressure upon the patient at step 505. At step 503, if the pressure within sleeve(s) 108 has not changed, the sensors 64 and main controller 18 return to step 502 and continue to monitor the pressure within sleeve (s) 108.

Figure 12:
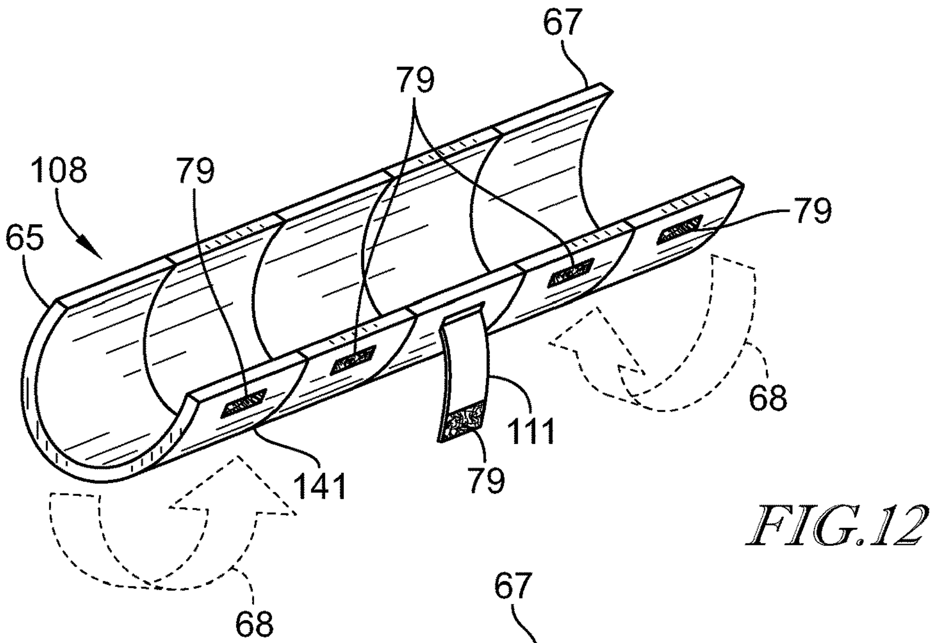
FIG. 12 is a perspective view of another embodiment of a sleeve of pneumatic therapy system of FIG. 1, the embodiment of FIG. 12 having the sleeve sized to be large and having a coupling mechanism and an elastic strap configured to size and secure the sleeve on the patient.
Figure 13:
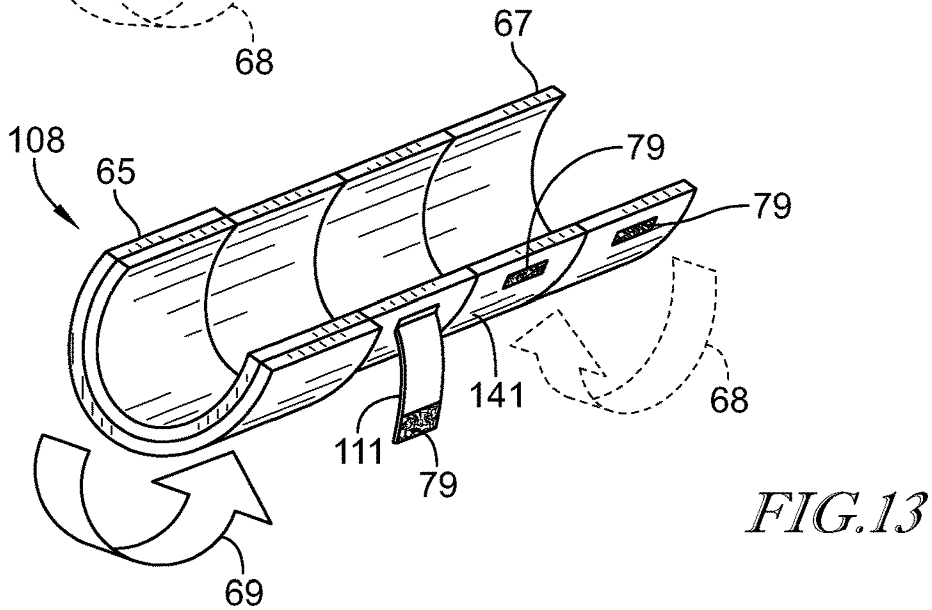
FIG. 13 is a perspective view of a sleeve similar to the sleeve of FIG. 12, the sleeve of FIG. 13 being modified with a first end of the sleeve folded upon the sleeve to shorten the length of the sleeve.
Figure 14:
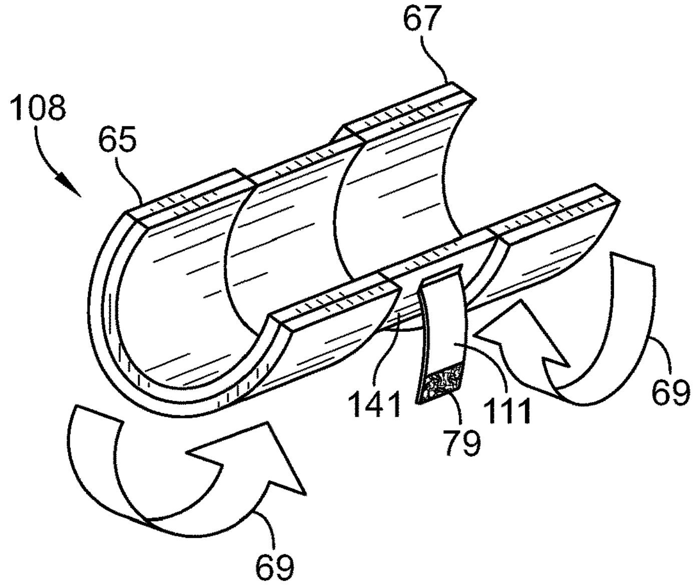
FIG. 14 is a perspective view of a sleeve similar to the sleeve of FIG. 12, the sleeve of FIG. 14 being modified with a first end and a second end of the sleeve folded upon the sleeve to shorten the length of the sleeve.

In some embodiments, sleeve(s) 108 are configured to move between a large size as shown in FIG. 12, a medium size as shown in FIG. 13, and a small size as shown in FIG. 14. Illustratively, sleeve(s) 108 are formed to include an outer surface 141 having a plurality of coupling mechanisms 79 formed therein and configured to fold upon itself. When a section of the sleeve 108 is folded, the pressurized air is blocked from entering the folded section, thereby allowing for adjustment of the size of the sleeve 108. As shown in FIG. 12, a first end 65 and a second end 67 of sleeve 108 are configured to fold as represented by arrows 68 and results in a large-sized sleeve 108. In FIG. 13, first end 65 has been folded upon sleeve 108 as represented by arrow 69 and second end 67 remains configured to fold upon itself and results in a medium-sized sleeve 108. In FIG. 14, both the first end 65 and the second end 67 are folded upon sleeve 108 as represented by arrows 69 and result in a small-sized sleeve 108. The change in the volume of a bladder (not shown) within sleeve 108 is sensed by sensors 64 and instructs air source 58, 258 to compensate and maintain a constant pressure within sleeve 108. In some embodiments, elastic straps 111 extend from sleeve 108 and is configured to engage the knee of a patient to accommodate different size knee areas of patients and removeably couple to the opposite side outer surface 141 of sleeve 108 using a coupling means 79. Such coupling means may be embodied as a hook and loop material and/or other known attachment means in the art.

In other embodiments, main controller 18 is configured to communicate with sensors 89 to monitor the coupling of compression sleeve 108 to port 15. Illustratively, sensor 89 is coupled to conduits 110 and/or sleeve(s) 108 and is configured to identify when sleeve(s) 108 couples to port 15. The main controller 18 is further configured to detect when sleeve(s) 108 is connected, allow a pre-determined amount of time to pass in which the caregiver may apply the sleeve(s) upon the patient, and automatically initiate therapy upon completion of the pre-determined amount of time. Upon automatic initiation, therapy system 10 is configured to provide therapy to the patient using default settings. Further, illustratively, sensor 89 is embodied as a Hall-effect sensor. Illustratively, this may be accomplished via the algorithm shown in FIG. 15.

Figure 15:
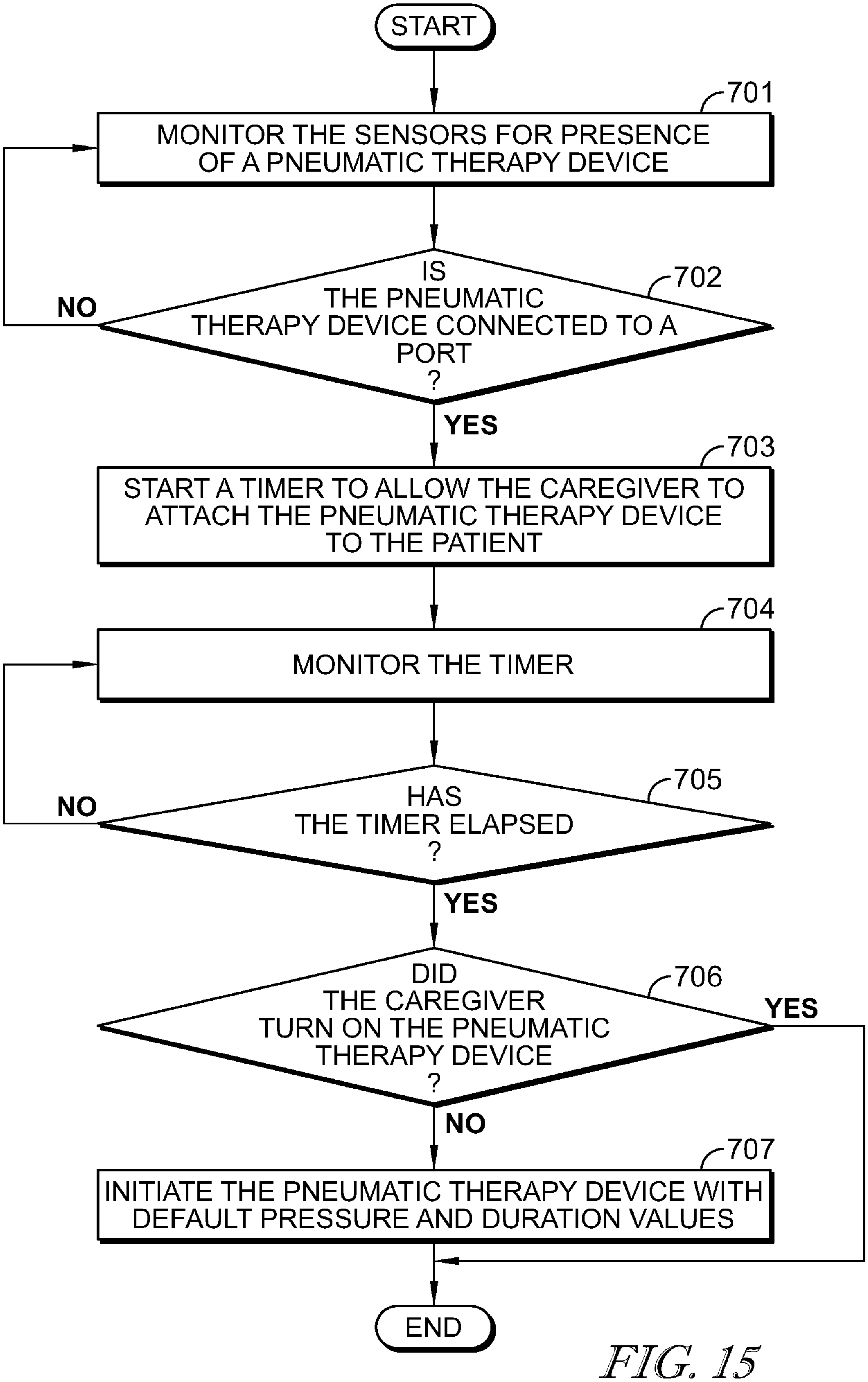
FIG. 15 is a flowchart showing an algorithm pre-programmed into the main controller configuring the main controller to monitor and identify the coupling of the pneumatic therapy device to the port and automatically initiate therapy upon a pre-preprogrammed length of time elapsing thereafter.

The algorithm as shown in FIG. 15 includes monitoring sensors 64 for the presence of pneumatic therapy device 14 coupled to port 15 at step 701. At step 702, main controller 18 determines the presence of pneumatic therapy device 14 at port 15. If there is no pneumatic therapy device 14 coupled to port 15, then the main controller returns to step 701 and continues monitoring the port 15 for the coupling of pneumatic therapy device 14 thereto. If there is a pneumatic therapy device 14 coupled to port 15, then a timer is initiated at step 703. The timer is configured to run for a pre-programmed length of time, and thereby allows time for the caregiver to place/attach pneumatic therapy device 14 upon patient. At step 704, the timer is monitored, and, at step 705, main controller 18 determines if the timer has elapsed. If not, then main controller 18 returns to step 704 and continues monitoring the timer. If the timer has elapsed, then main controller 18 determines if the caregiver turned on pneumatic therapy device 14 at step 706. If not, then therapy is automatically initiated having default pressure and duration values at step 707. If the pneumatic therapy device 14 has been turned on, then the algorithm ends.

Figure 16:
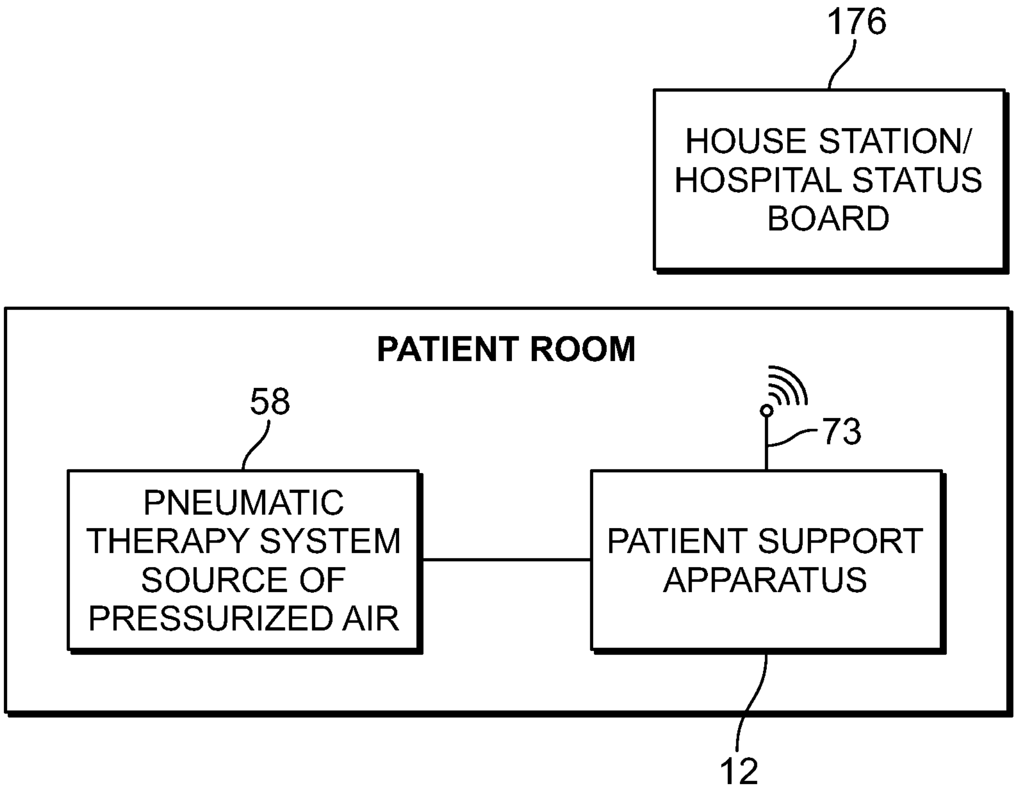
FIG. 16 is a block diagram of another embodiment of the bed of FIG. 1 showing the bed configured to communicate with a nurse's station/hospital status board using radio communication.

In some embodiments, patient support apparatus 12 is configured to use radio means to determine if source of air 58, 258 is functioning normally as shown in FIG. 16. Illustratively, patient support apparatus 12 is already formed to include an antenna 73 configured to communicate information between pneumatic therapy system source of air 58, 258, patient support apparatus 12, and nurses' station/hospital board 176. Such information may include patient data, measured therapy data, location of therapy device 14, etc. Illustratively, information is communicated between patient support apparatus 12 and nurses' station 176.

Figure 17:
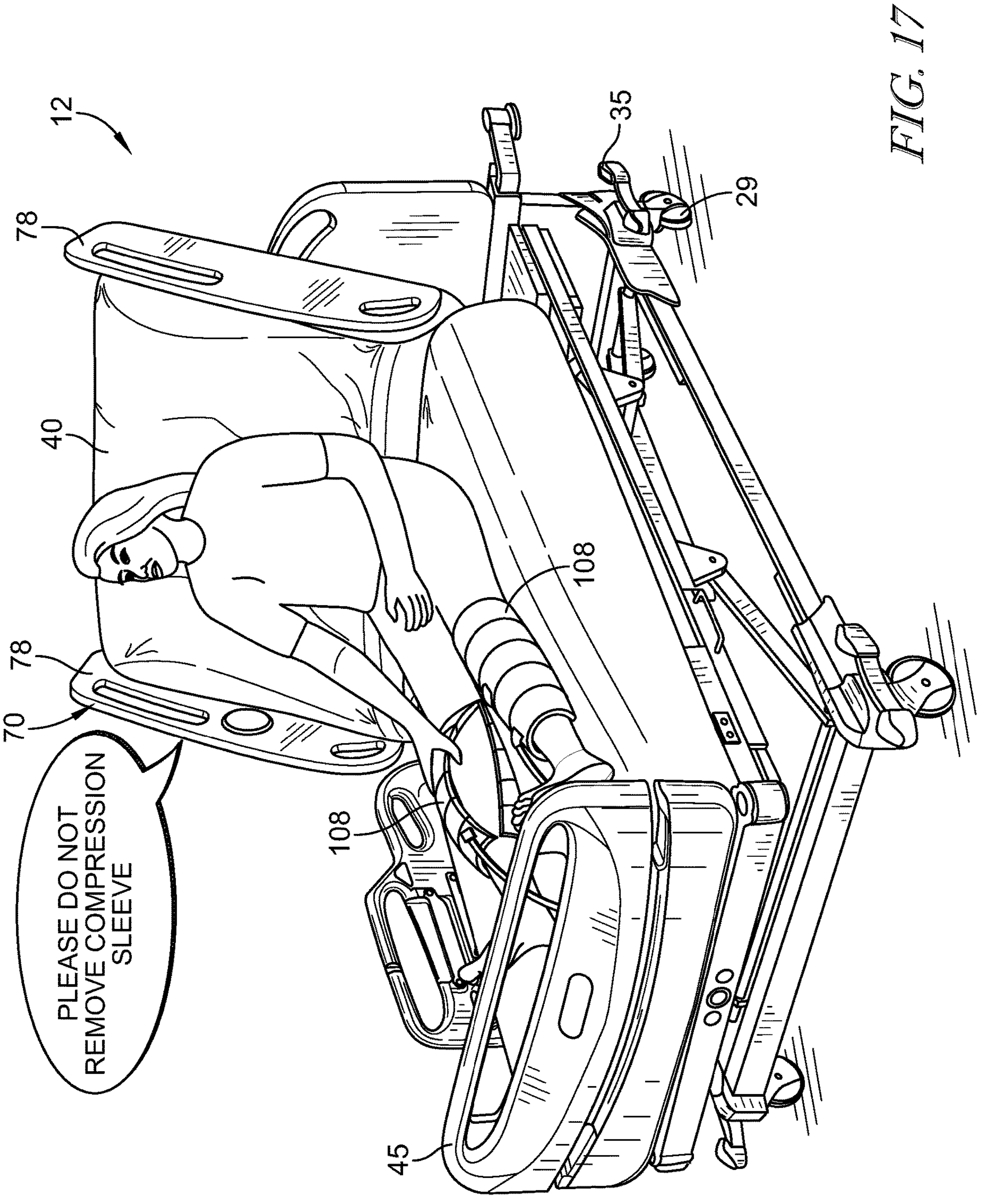
FIG. 17 is a perspective view of an additional embodiment of the bed shown in FIG. 1 showing the patient attempting to remove the sleeve(s) from the patient's leg and an audible alert emanating from the bed in response.

In further embodiments, patient support apparatus 12 is in communication with sensor(s) 64 coupled to sleeve(s) 108 and configured to identify sleeve 108 removal as shown in FIG. 17. Sensors 64 are configured to detect when the patient disconnects sleeve(s) 108 and informs the patient using an audible alert conveyed through patient support apparatus 12. Illustratively, sensors 89 automatically detect when the patient removes sleeves 108 based on a change in the magnetic field and/or a decrease in temperature. Sensed information may be conveyed to main controller 18 through BLUETOOTH® or hardwired into sleeve(s) 108 and patient support apparatus 12 to produce the audible alert. Illustratively, the alert emanates from patient support apparatus 12 and says, for example, "Please do not remove compression sleeve." Other phrases and sayings may also emanate from patient support apparatus 12. An audible alert is configured to inform the patient that they reattachment of sleeve(s) 108 is needed whether removed intentionally or is sleeve(s) were misplaced during movement of patient support apparatus 12. Further, an additional alert may be sent to the nurses' station 176 that sleeve(s) 108 had been removed from the patient.

Although certain illustrative embodiments have been described in detail above, variations and modifications exist within the scope and spirit of this disclosure as described and as defined in the following claims.

The invention claimed is:

1. A therapy system comprising a pneumatic therapy device, and a patient support apparatus, the patient support apparatus including a removable component, the removable component including a mounting pin operable to engage a mounting hole on a frame of the patient support apparatus, the engagement of the mounting pin to the mounting hole providing an electrical connection such that direct current is transferred from the frame to the component, wherein the removable component includes an air system operable to a flow of air to the pneumatic therapy device and a port in the patient support apparatus operable to be engaged by a conduit of the pneumatic therapy device to provide a flow path from the air system to a compression sleeve of the pneumatic therapy device, and wherein the therapy system further comprises a user interface supported on the frame, and a controller including a processor and a memory device, the memory device including instructions that are executable by the processor to control a source of pressurized air, an air distribution system, and user interface, the instructions causing the controller to be operable to detect that an end of the conduit of the pneumatic therapy device has been connected to the outlet of the distribution system and provide an interface screen on the user interface to allow a user to control of the source of pressurized air to operate the pneumatic therapy device to provide therapy to an occupant of the patient support apparatus, wherein the memory device includes further instructions that, when executed by the processor, cause the controller to monitor for the presence of a pneumatic therapy device, and, if a pneumatic therapy device is detected, initiate a timer to monitor for the initiation of a pneumatic therapy by a caregiver, and if the caregiver does not initiate a pneumatic therapy in the predetermined time, initiate the pneumatic therapy automatically.

2. The therapy system of claim 1, wherein the air system is contained within the removable component.

3. The therapy system of claim 2, wherein the air system is powered by isolated DC power.

4. The therapy system of claim 3, wherein the power is provided by a battery on the patient support apparatus.

5. The therapy system of claim 1, wherein the air system is coupled to a port on the removable component and receives power through a coupling to the port.

6. The therapy system of claim 5, wherein the power is isolated DC power.

7. The therapy system of claim 6, wherein the power is provided by a battery on the patient support apparatus.

8. The therapy system of claim 1, wherein the memory device includes further instructions that, when executed by the processor, cause the controller to fill a compression sleeve of the pneumatic therapy device with air, monitor the pressure in the sleeve, determine whether the pressure in the sleeve has changed, and, if the pressure has changed, compute a therapeutic pressure for the particular patient, and apply the therapeutic pressure to the patient during the pneumatic therapy.

9. The therapy system of claim 1, wherein the memory device includes further instructions that, when executed by the processor, cause the controller to monitor a sensor to determine if the pneumatic therapy device has been removed by a patient, and, if the pneumatic therapy device has been removed by the patient, issue an alarm.

10. The therapy system of claim 9, wherein the memory device includes further instructions that, when executed by the processor, cause the controller to issue an audible verbal prompt regarding the patient therapy device.

11. The therapy system of claim 1, wherein the therapy system further comprises a user interface supported on the frame, and a controller including a processor and a memory device, the memory device including instructions that are executable by the processor to control the source of pressurized air, the distribution system, and the user interface, the instructions cause the controller to be operable to detect that an end of the conduit of the pneumatic therapy device has been connected to the outlet of the distribution system and provide an interface screen on the user interface to allow a user to control of the source of pressurized air to operate the pneumatic therapy device to provide therapy to an occupant of the patient support apparatus.

12. The therapy system of claim 11, wherein the memory device includes further instructions that, when executed by the processor, cause the controller to fill a compression sleeve of the pneumatic therapy device with air, monitor the pressure in the sleeve, determine whether the pressure in the sleeve has changed, and, if the pressure has changed, compute a therapeutic pressure for the particular patient, and apply the therapeutic pressure to the patient during the pneumatic therapy.

13. The therapy system of claim 11, wherein the memory device includes further instructions that, when executed by the processor, cause the controller to monitor for the presence of a pneumatic therapy device, and, if a pneumatic therapy device is detected, initiate a timer to monitor for the initiation of a pneumatic therapy by a caregiver, and if the caregiver does not initiate a pneumatic therapy in a predetermined time, initiate the pneumatic therapy automatically.

14. The therapy system of claim 11, wherein the memory device includes further instructions that, when executed by the processor, cause the controller to monitor a sensor to determine if the pneumatic therapy device has been removed by a patient, and, if the pneumatic therapy device has been removed by the patient, issue an alarm and issue an audible verbal prompt regarding the patient therapy device.

15. The therapy system of claim 1, wherein the pneumatic therapy device comprises a compression sleeve that is adjustable to vary the size of the compression sleeve when applying the compression sleeve to a particular patient.

16. A therapy system comprising a pneumatic therapy device a including a compression sleeve and a conduit having a first end coupled to the compressions sleeve and a second end, a patient support apparatus, the patient support apparatus including a frame, a source of pressurized air supported by the frame, wherein, the source of pressurized air is located outside an air system connected to the pneumatic therapy device, the source of pressurized air providing pressurized air to both the patient support apparatus and the pneumatic therapy device, a distribution assembly including a distribution manifold located on a mattress positioned on the patient support apparatus, the distribution manifold including a valve and a sensor to adjust pressure of the air before the air enters the removable component when the pneumatic therapy device is engaged at the port, a conduit for directing a flow of pressurized air from the source of pressurized air, and an outlet-a user interface supported on the frame, a controller including a processor and a memory device, the memory device including instructions that are executable by the processor to control the source of pressurized air, distribution system, and user interface, the instructions operable to detect that the second end of the conduit of the pneumatic therapy device has been connected to the outlet of the distribution assembly, and if the conduit has been connected, initiate a timer to monitor for the initiation of a pneumatic therapy by a caregiver, and if the caregiver does not initiate a pneumatic therapy in a predetermined time, initiate the pneumatic therapy automatically.

17. The therapy system of claim 16, wherein the memory device includes further instructions that, when executed by the processor, cause the controller to monitor for the presence of a pneumatic therapy device, and, if a pneumatic therapy device is detected, determine whether the pressure in the sleeve has changed, and, if the pressure has changed, compute a therapeutic pressure for a particular patient, and apply the therapeutic pressure to the patient during the pneumatic therapy.

18. The therapy system of claim 16, wherein the memory device includes further instructions that, when executed by the processor, cause the controller to monitor a sensor to determine if the pneumatic therapy device has been removed by a patient, and, if the pneumatic therapy device has been removed by the patient, issue an alarm.

19. The therapy system of claim 18, wherein the memory device includes further instructions that, when executed by the processor, cause the controller to issue an audible verbal prompt regarding the patient therapy device.

20. The therapy system of claim 19, wherein the pneumatic therapy device comprises a compression sleeve that is adjustable to vary the size of the compression sleeve when applying the compression sleeve to a particular patient.

* * * * *